US011823466B2

United States Patent
Nakagawa et al.

(10) Patent No.: US 11,823,466 B2
(45) Date of Patent: Nov. 21, 2023

(54) OBJECT DETECTION DEVICE, OBJECT DETECTION SYSTEM, AND OBJECT DETECTION METHOD

(71) Applicants: SONY GROUP CORPORATION, Tokyo (JP); SONY SEMICONDUCTOR SOLUTIONS CORPORATION, Kanagawa (JP)

(72) Inventors: Kei Nakagawa, Tokyo (JP); Shin Kitano, Tokyo (JP)

(73) Assignees: SONY GROUP CORPORATION, Tokyo (JP); SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 63 days.

(21) Appl. No.: 17/438,585

(22) PCT Filed: Mar. 10, 2020

(86) PCT No.: PCT/JP2020/010189
§ 371 (c)(1),
(2) Date: Sep. 13, 2021

(87) PCT Pub. No.: WO2020/195769
PCT Pub. Date: Oct. 1, 2020

(65) Prior Publication Data
US 2022/0172486 A1 Jun. 2, 2022

(30) Foreign Application Priority Data
Mar. 27, 2019 (JP) .................. 2019-060216

(51) Int. Cl.
*G06V 20/58* (2022.01)
*H04N 23/61* (2023.01)
(Continued)

(52) U.S. Cl.
CPC ............. *G06V 20/58* (2022.01); *H04N 23/61* (2023.01); *H04N 23/745* (2023.01); *H04N 25/47* (2023.01); *H04N 25/707* (2023.01)

(58) Field of Classification Search
CPC ...... H04N 25/47; H04N 25/707; H04N 23/61; G06V 20/58
See application file for complete search history.

(56) References Cited

U.S. PATENT DOCUMENTS

| 10,944,912 B2 * | 3/2021 | Herman ................. H04N 23/71 |
| 11,416,759 B2 * | 8/2022 | Lang .................... H04N 25/443 |

(Continued)

FOREIGN PATENT DOCUMENTS

| CN | 106462976 A | 2/2017 |
| CN | 110546945 A | 12/2019 |

(Continued)

OTHER PUBLICATIONS

Yabuuchi K, Hirano M, Senoo T, Kishi N, Ishikawa M. Real-Time Traffic Light Detection with Frequency Patterns Using a High-speed Camera. Sensors (Basel). 2020;20(14):4035. Published Jul. 20, 2020. doi:10.3390/s20144035 (Year: 2020).*

(Continued)

*Primary Examiner* — Joel W Fosselman
(74) *Attorney, Agent, or Firm* — CHIP LAW GROUP

(57) ABSTRACT

A characteristic of a flicker component is detected to perform object detection at a higher speed and with higher accuracy. An object detection device according to an embodiment is provided with a solid-state imaging device (200) provided with a plurality of pixels arranged in a matrix, the solid-state imaging device that detects, according to a light amount incident on each of the pixels, occurrence of an event in the pixel, a flicker detection unit (12) that generates flicker information on the basis of the occurrence (Continued)

of the event detected by the solid-state imaging device, and an object detection unit (15) that detects an object on the basis of the flicker information detected by the solid-state imaging device.

12 Claims, 16 Drawing Sheets

(51) Int. Cl.
*H04N 23/745* (2023.01)
*H04N 25/47* (2023.01)
*H04N 25/707* (2023.01)

(56) References Cited

U.S. PATENT DOCUMENTS

| | | | |
|---|---|---|---|
| 2016/0252905 A1* | 9/2016 | Tian | G06V 20/584 701/23 |
| 2017/0053407 A1 | 2/2017 | Benosman et al. | |
| 2018/0336692 A1* | 11/2018 | Wendel | G06T 7/593 |
| 2019/0096068 A1 | 3/2019 | Fontanel et al. | |
| 2021/0044744 A1* | 2/2021 | Sironi | H04N 25/40 |
| 2021/0067679 A1* | 3/2021 | Tornes | H04N 23/745 |
| 2021/0385402 A1* | 12/2021 | Zhu | H04N 25/75 |
| 2023/0009479 A1* | 1/2023 | Suzuki | G06V 20/56 |

FOREIGN PATENT DOCUMENTS

| | | | | |
|---|---|---|---|---|
| DE | 102019126812 A1 | * | 4/2021 | |
| FR | 3020699 A1 | | 11/2015 | |
| GB | 2586802 A | * | 3/2021 | ............ B60R 1/005 |
| JP | 2016-533140 A | | 10/2016 | |
| JP | 2016178523 A | * | 10/2016 | |
| JP | 2017-521746 A | | 8/2017 | |
| JP | 2018/186478 A | | 11/2018 | |
| JP | 2020136958 A | * | 8/2020 | ............ H04N 5/341 |
| JP | 2021111929 A | * | 8/2021 | |
| WO | 2015/166176 A1 | | 11/2015 | |
| WO | 2018/198691 A1 | | 11/2018 | |
| WO | 2019/066476 A1 | | 4/2019 | |
| WO | WO-2021190745 A1 | * | 9/2021 | |

OTHER PUBLICATIONS

V. Chan, C. Jin and A. van Schaik, "An Address-Event Vision Sensor for Multiple Transient Object Detection," in IEEE Transactions on Biomedical Circuits and Systems, vol. 1, No. 4, pp. 278-288, Dec. 2007, doi: 10.1109/TBCAS.2007.916031. (Year: 2007).*

International Search Report and Written Opinion of PCT Application No. PCT/JP2020/010189, dated Jun. 9, 2020, 09 pages of ISRWO.

* cited by examiner

OBJECT DETECTION DEVICE, OBJECT DETECTION SYSTEM, AND OBJECT DETECTION METHOD

CROSS REFERENCE TO RELATED APPLICATIONS

This application is a U.S. National Phase of International Patent Application No. PCT/JP2020/010189 filed on Mar. 10, 2020, which claims priority benefit of Japanese Patent Application No. JP 2019-060216 filed in the Japan Patent Office on Mar. 27, 2019. Each of the above-referenced applications is hereby incorporated herein by reference in its entirety.

TECHNICAL FIELD

The present disclosure relates to an object detection device, an object detection system, and an object detection method.

BACKGROUND ART

In recent years, technologies of detecting an object present around a vehicle from an image obtained by imaging the periphery of the vehicle and assisting automatic driving to allow the vehicle to autonomously travel or driving by a driver on the basis of a detection result have been actively developed.

CITATION LIST

Patent Document

Patent Document 1: Japanese Unexamined Patent Publication No. 2016-533140

SUMMARY OF THE INVENTION

Problems to be Solved by the Invention

Here, a traffic light that performs traffic control, an electric bulletin board, a vehicle light and the like include various flicker components corresponding to a light source, a power supply and the like, and it is considered that an object may be detected with higher accuracy and at a higher speed by using the flicker components.

However, in a general image sensor that obtains image data at a predetermined frame rate, it is difficult to measure a characteristic such as a frequency of the flicker component emitted from the traffic light, the electric bulletin board, the vehicle light and the like.

Therefore, the present disclosure proposes an object detection device, an object detection system, and an object detection method capable of detecting a characteristic of a flicker component and detecting an object at a higher speed and with higher accuracy.

Solutions to Problems

In order to solve the above-described problem, an object detection device according to an embodiment of the present disclosure is provided with a solid-state imaging device provided with a plurality of pixels arranged in a matrix, the solid-state imaging device that detects, according to a light amount incident on each of the pixels, occurrence of an event in the pixel, a flicker detection unit that generates flicker information on the basis of the occurrence of the event detected by the solid-state imaging device, and an object detection unit that detects an object on the basis of the flicker information detected by the solid-state imaging device.

MODE FOR CARRYING OUT THE INVENTION

Figure 1:
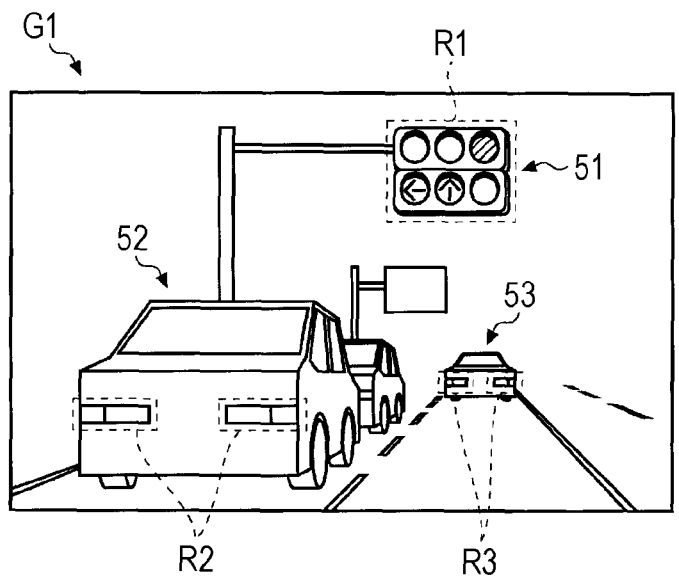
FIG. 1 is a view for explaining an object in which a flicker component is detected within an angle of view.

Hereinafter, an embodiment of the present disclosure is described in detail with reference to the drawings. Note that, in the following embodiments, the same parts are denoted by the same reference numerals, and the description thereof is not repeated.

Furthermore, the present disclosure is described according to the following item order.
 1. First Embodiment
 1.1 Configuration Example of Object Detection Device (or System)
 1.2 Configuration Example of DVS
 1.3 Configuration Example of Unit Pixel
 1.4 Configuration Example of Address Event Detection Unit
 1.4.1 Configuration Example of Current-voltage Conversion Unit
 1.4.2 Configuration Example of Subtractor and Quantizer
 1.5 Application Example to Mobile Body
 1.6 Arrangement Example of DVS
 1.7 Object Detection Operation Example
 1.8 Action and Effect
 2. Second Embodiment
 2.1 Configuration Example of Object Detection Device (or System)
 2.2 Object Detection Operation Example
 2.3 Action and Effect
 2.4 Variation
 3. Third Embodiment
 3.1 Object Detection Operation Example
 3.2 Action and Effect
 4. Fourth Embodiment
 4.1 Object Detection Operation Example
 4.2 Action and Effect
 5. Fifth Embodiment
 5.1 First Example
 5.2 Second Example
 5.3 Third Example
 5.4 Fourth Example

1. First Embodiment

First, a first embodiment is described in detail with reference to the drawings.

As described above, an object such as a traffic light, an electric bulletin board, and a vehicle light emits a flicker component that repeats blinking at a high speed. For example, as illustrated in FIG. 1, in a case where a traffic light 51 and preceding vehicles 52 and 53 are present within an angle of view G1, a lighting light of the traffic light 51, a lighting arrow of an arrow-type traffic light, and a taillight, a brake light, and a blinker of the preceding vehicles 52 and 53 emit the flicker component that repeats blinking at a high speed.

It is difficult to obtain a characteristic (hereinafter, referred to as a flicker characteristic) such as a frequency and a duty ratio of the flicker component emitted by such object by a synchronous image sensor that obtains image data at a certain predetermined frame rate in synchronization with a synchronization signal such as a vertical synchronization signal.

Therefore, in this embodiment, the characteristic of the flicker component emitted by the object is obtained using an asynchronous image sensor (hereinafter, referred to as a dynamic vision sensor (DVS)) in which a detection circuit that detects in real time that a light reception amount exceeds a threshold as an address event is provided for each pixel.

In a general DVS, a so-called event-driven drive system is adopted in which it is detected whether or not the address event occurs for each unit pixel, and in a case where the occurrence of the address event is detected, a pixel signal is read from the unit pixel in which the address event occurs.

Furthermore, since a read operation is executed on the unit pixel in which the occurrence of the address event is detected in the general DVS, this has a characteristic that reading at a very high speed may be performed as compared with a synchronous image sensor in which the read operation is executed on all the unit pixels.

By using the DVS having such characteristic, it becomes possible to detect the flicker characteristic of the object with high accuracy. Accordingly, it becomes possible to realize an object detection system and an object detection method capable of detecting an object at a higher speed and with higher accuracy.

Note that the unit pixel in this description is a minimum unit of a pixel including one photoelectric conversion element (also referred to as a light receiving element), and corresponds to each dot in the image data read from the image sensor, for example. Furthermore, the address event is an event that occurs in each address assigned to each of a plurality of unit pixels arranged in a two-dimensional lattice pattern such as, for example, an event that a current value of a current (hereinafter, referred to as a photocurrent) based on a charge generated in the photoelectric conversion element or a change amount thereof exceeds a certain threshold.

1.1 Configuration Example of Object Detection Device (or System)

Figure 2:
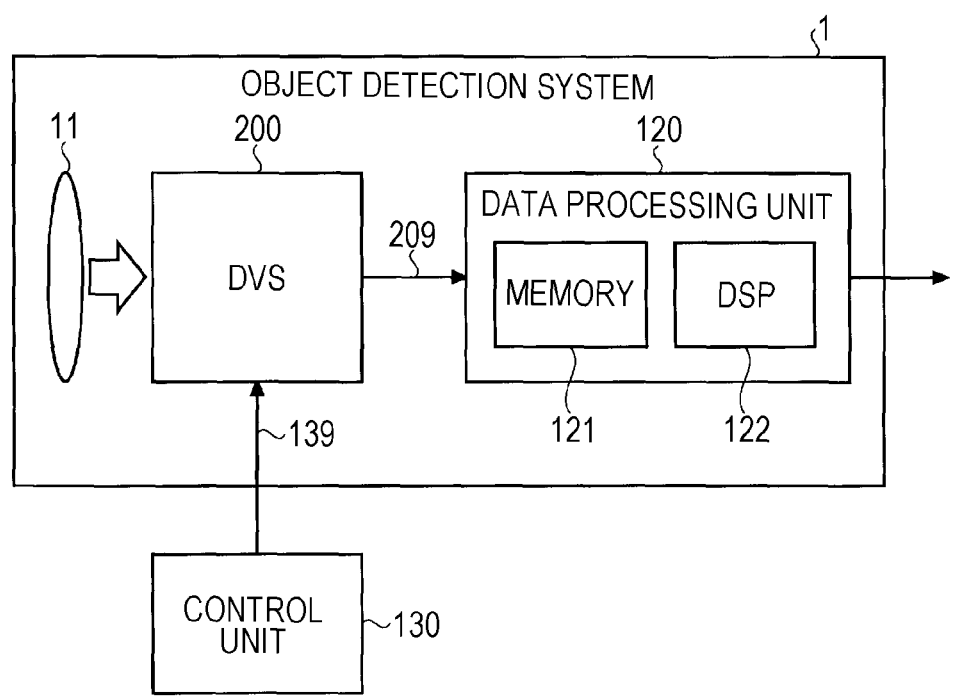
FIG. 2 is a block diagram illustrating a schematic configuration example of an object detection device (system) according to a first embodiment.

FIG. 2 is a block diagram illustrating a schematic configuration example of an object detection device (or an object detection system, hereinafter, referred to as the object detection device) according to the first embodiment. As illustrated in FIG. 2, an object detection device 1 is provided with, for example, an imaging lens 11, a DVS (first solid-state imaging device) 200, and a data processing unit 120, and occurrence of an address event in the DVS 200 is monitored on the basis of an instruction from an external control unit 130.

The imaging lens 11 is an example of an optical system that condenses incident light and forms an image thereof on a light receiving surface of the DVS 200. The light receiving surface may be a surface on which photoelectric conversion elements are arranged in the DVS 200.

The DVS 200 detects the occurrence of the address event on the basis of an amount of the incident light, and generates address information for specifying a unit pixel in which the occurrence of the address event is detected as event detection data. The event detection data may include time information such as a time stamp indicating a timing at which the occurrence of the address event is detected.

The generated event detection data is output to the data processing unit 120 via a signal line 209.

The data processing unit 120 is provided with, for example, a memory 121 and a digital signal processor (DSP) 122.

The memory 121 includes, for example, a flash memory, a dynamic random access memory (DRAM), a static random access memory (SRAM) and the like, and records the data input from the DVS 200.

For example, the DSP 122 executes predetermined signal processing on the event detection data input from the DVS 200 to execute object detection processing on an object that causes the occurrence of the address event.

More specifically, the DSP 122 specifies an area in which a flicker component is detected (corresponding to a flicker detection area to be described later) on the basis of, for example, the number of pieces of event detection data input from the DVS 200 within a unit time (corresponding to the number of detected events N to be described later), a duty ratio and the like (function as a flicker detection unit). Then, for example, the DSP 122 executes the object detection processing on the object that causes the occurrence of the address event on the basis of the specified flicker detection area (function as an object detection unit).

At that time, the DSP 122 may operate as a machine learning unit using a deep neural network (DNN) by executing a program stored in the memory 121, for example. In this case, the DSP 122 executes the program of a learned model stored in the memory 121, thereby executing processing of multiplying a dictionary coefficient stored in the memory 121 by the event detection data. Note that, as a method of machine learning, various methods such as a recurrent neural network (RNN) and a convolution neural network (CNN) may be utilized.

Note that the DSP 122 does not have to execute all the steps of the object detection processing, and may execute at least some of the steps. For example, in a case of detecting the object from the event detection data utilizing the CNN, the DSP 122 may execute a convolutional layer and/or a pooling layer being a part of hidden layers.

A result obtained by such object detection processing (also including a result obtained by the DSP 122 by executing a part of the object detection processing) is output to, for example, an external information processing device (corresponding to a vehicle exterior information detection unit 12030 and/or a microcomputer 12051 to be described later) and the like.

The control unit 130 includes, for example, a central processing unit (CPU) and the like, and controls each unit in the object detection device 1 such as the DVS 200 by outputting various instructions via a signal line 139.

In the above-described configuration, the DVS 200 and the data processing unit 120 may include, for example, a single semiconductor chip. Furthermore, the semiconductor chip may be a multi-layer chip obtained by adhering a plurality of dies to each other.

1.2 Configuration Example of DVS

Figure 3:
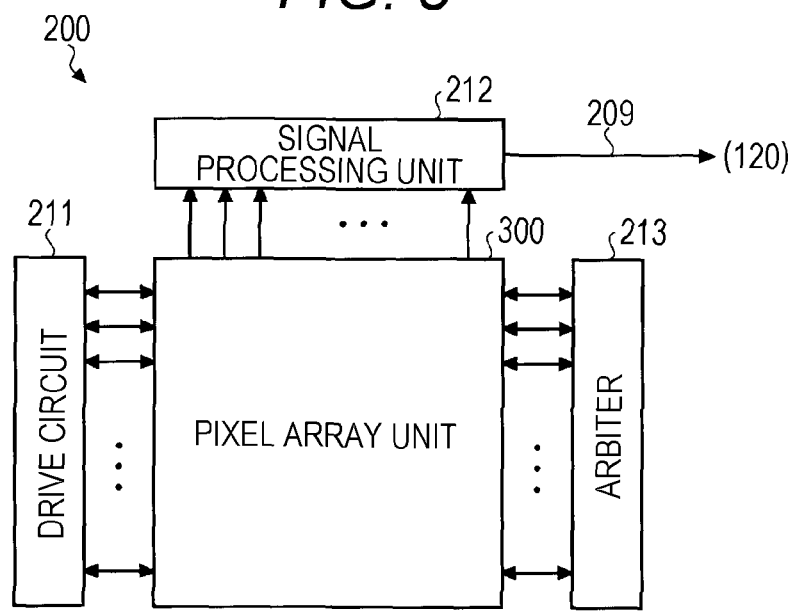
FIG. 3 is a block diagram illustrating a functional configuration example of a DVS according to the first embodiment.

Subsequently, a configuration example of the DVS 200 is described in detail with reference to the drawings. FIG. 3 is a block diagram illustrating a functional configuration example of the DVS according to the first embodiment. As illustrated in FIG. 3, the DVS 200 is provided with a drive circuit 211, a signal processing unit 212, an arbiter 213, and a pixel array unit 300.

In the pixel array unit 300, a plurality of unit pixels is arranged in a two-dimensional lattice pattern. As is described later in detail, the unit pixel includes, for example, a photoelectric conversion element such as a photodiode, and a pixel circuit (in this embodiment, corresponding to an address event detection unit 400 described later) that detects whether or not the address event occurs on the basis of whether or not a current value of a photocurrent by a charge generated in the photoelectric conversion element or a change amount thereof exceeds a predetermined threshold. Here, the pixel circuit may be shared by a plurality of photoelectric conversion elements. In this case, each unit pixel includes one photoelectric conversion element and a shared pixel circuit.

A plurality of unit pixels of the pixel array unit 300 may be grouped into a plurality of pixel blocks each including a predetermined number of unit pixels. Hereinafter, a set of unit pixels or pixel blocks arranged in a horizontal direction is referred to as a "row", and a set of unit pixels or pixel blocks arranged in a direction perpendicular to the row is referred to as a "column".

When the occurrence of the address event is detected in the pixel circuit, each unit pixel outputs a request for reading a signal from the unit pixel to the arbiter 213.

The arbiter 213 arbitrates the request from one or more unit pixels, and transmits a predetermined response to the unit pixel that issues the request on the basis of a result of the arbitration. The unit pixel that receives this response outputs a detection signal indicating the occurrence of the address event to the drive circuit 211 and the signal processing unit 212.

The drive circuit 211 sequentially drives the unit pixel that outputs the detection signal, thereby allowing the unit pixel in which the occurrence of the address event is detected to output a signal according to the light reception amount, for example, to the signal processing unit 212. Note that the DVS 200 may be provided with an analog-digital converter for converting a signal read from a photoelectric conversion element 333 to be described later into a signal of a digital value according to a charge amount thereof, for example, for each unit pixel or a plurality of unit pixels, or for each column.

The signal processing unit 212 executes predetermined signal processing on the signal input from the unit pixel, and supplies a result of the signal processing as the event detection data to the data processing unit 120 via the signal line 209. Note that, as described above, the event detection data may include the address information of the unit pixel in which the occurrence of the address event is detected, and the time information such as the time stamp indicating the timing at which the address event occurs.

1.3 Configuration Example of Unit Pixel

Figure 4:
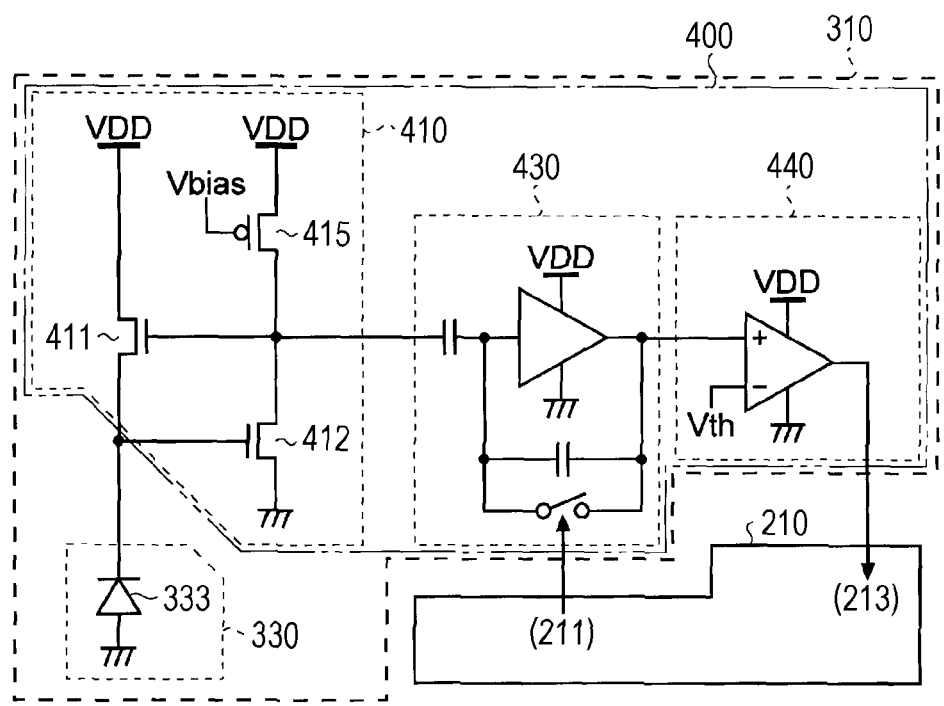
FIG. 4 is a circuit diagram illustrating a schematic configuration example of a unit pixel according to the first embodiment.

Subsequently, a configuration example of a unit pixel 310 is described. FIG. 4 is a circuit diagram illustrating a schematic configuration example of the unit pixel according to the first embodiment. As illustrated in FIG. 4, the unit pixel 310 is provided with, for example, a light reception unit 330 and the address event detection unit 400. Note that a logic circuit 210 in FIG. 4 may be, for example, a logic circuit including the drive circuit 211, the signal processing unit 212, and the arbiter 213 in FIG. 3.

The light reception unit 330 is provided with, for example, the photoelectric conversion element 333 such as a photodiode, and an output thereof is connected to the address event detection unit 400.

The address event detection unit 400 is provided with, for example, a current-voltage conversion unit 410 and a subtractor 430. However, the address event detection unit 400 is provided with a buffer, a quantizer, and a transfer unit in addition to them. The address event detection unit 400 is described later in detail with reference to FIG. 5 and the like.

In such a configuration, the photoelectric conversion element 333 of the light reception unit 330 photoelectrically converts the incident light to generate the charge. The charge generated in the photoelectric conversion element 333 is input to the address event detection unit 400 as the photocurrent of the current value according to the charge amount.

1.4 Configuration Example of Address Event Detection Unit

Figure 5:
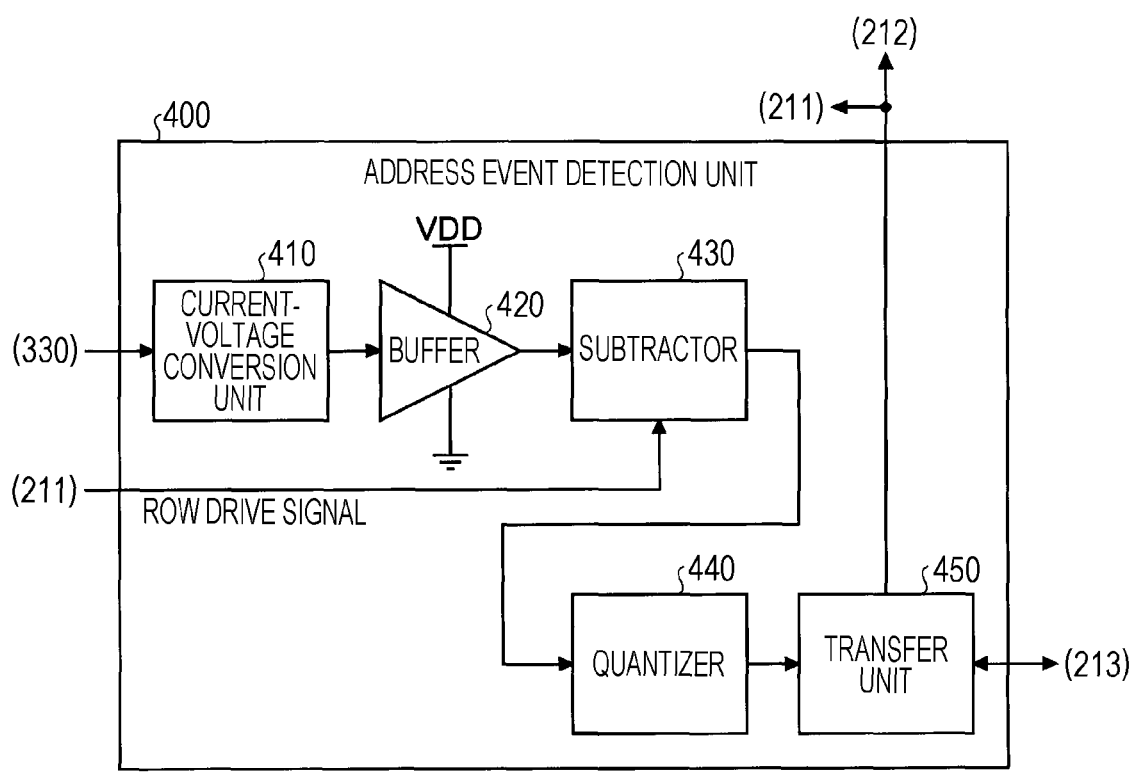
FIG. 5 is a block diagram illustrating a schematic configuration example of an address event detection unit in the first embodiment.

FIG. 5 is a block diagram illustrating a schematic configuration example of the address event detection unit in the first embodiment. As illustrated in FIG. 5, the address event detection unit 400 is provided with a buffer 420 and a transfer unit 450 in addition to the current-voltage conversion unit 410, the subtractor 430, and a quantizer 440 illustrated also in FIG. 5.

The current-voltage conversion unit 410 converts the photocurrent from the light reception unit 330 into a voltage signal of a logarithm thereof, and outputs the voltage signal generated by this to the buffer 420.

The buffer 420 corrects the voltage signal from the current-voltage conversion unit 410 and outputs the corrected voltage signal to the subtractor 430.

The subtractor 430 lowers a voltage level of the voltage signal from the buffer 420 according to a row drive signal from the drive circuit 211, and outputs the lowered voltage signal to the quantizer 440.

The quantizer 440 quantizes the voltage signal from the subtractor 430 into a digital signal, and outputs the digital signal generated by this to the transfer unit 450 as the detection signal.

The transfer unit 450 transfers the detection signal from the quantizer 440 to the signal processing unit 212 and the like. For example, when the occurrence of the address event is detected, the transfer unit 450 outputs to the arbiter 213 a request for requesting transmission of the detection signal of the address event from the transfer unit 450 to the drive circuit 211 and the signal processing unit 212. Then, upon receiving a response to the request from the arbiter 213, the transfer unit 450 outputs the detection signal to the drive circuit 211 and the signal processing unit 212.

1.4.1 Configuration Example of Current-voltage Conversion Unit

The current-voltage conversion unit 410 in the configuration illustrated in FIG. 5 may be, for example, a so-called source follower current-voltage conversion unit provided with an LG transistor 411, an amplification transistor 412, and a constant current circuit 415 as illustrated in FIG. 4. However, there is no limitation; this may also be a so-called gain boost current-voltage converter provided with two LG transistors 411 and 413, two amplification transistors 412 and 414, and the constant current circuit 415 as illustrated in FIG. 6, for example.

As illustrated in FIG. 4, a source of the LG transistor 411 and a gate of the amplification transistor 412 are connected to, for example, a cathode of the photoelectric conversion element 333 of the light reception unit 330. A drain of the LG transistor 411 is connected to a power supply terminal VDD, for example.

Furthermore, for example, a source of the amplification transistor 412 is grounded, and a drain thereof is connected to the power supply terminal VDD via the constant current circuit 415. The constant current circuit 415 may include, for example, a load MOS transistor such as a P-type metal-oxide-semiconductor (MOS) transistor.

Figure 6:
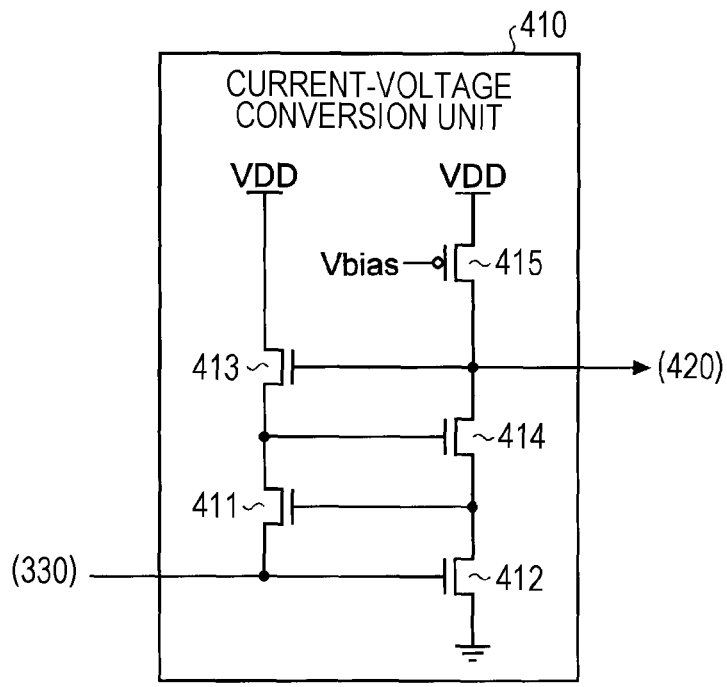
FIG. 6 is a circuit diagram illustrating another example of a current-voltage conversion unit according to the first embodiment.

In contrast, in a case of the gain boost type, as illustrated in FIG. 6, the source of the LG transistor 411 and the gate of the amplification transistor 412 are connected to, for example, the cathode of the photoelectric conversion element 333 of the light reception unit 330. Furthermore, the drain of the LG transistor 411 is connected to, for example, a source of the LG transistor 413 and the gate of the amplification transistor 412. A drain of the LG transistor 413 is connected to the power supply terminal VDD, for example.

Furthermore, for example, a source of the amplification transistor 414 is connected to a gate of the LG transistor 411 and the drain of the amplification transistor 412. A drain of the amplification transistor 414 is connected to the power supply terminal VDD via the constant current circuit 415, for example.

A loop-shaped source follower circuit is formed by a connection relationship illustrated in FIG. 4 or 6. Therefore, the photocurrent from the light reception unit 330 is converted into a voltage signal of a logarithmic value according to the charge amount thereof. Note that each of the LG transistors 411 and 413 and the amplification transistors 412 and 414 may include, for example, an NMOS transistor.

1.4.2 Configuration Example of Subtractor and Quantizer

Figure 7:
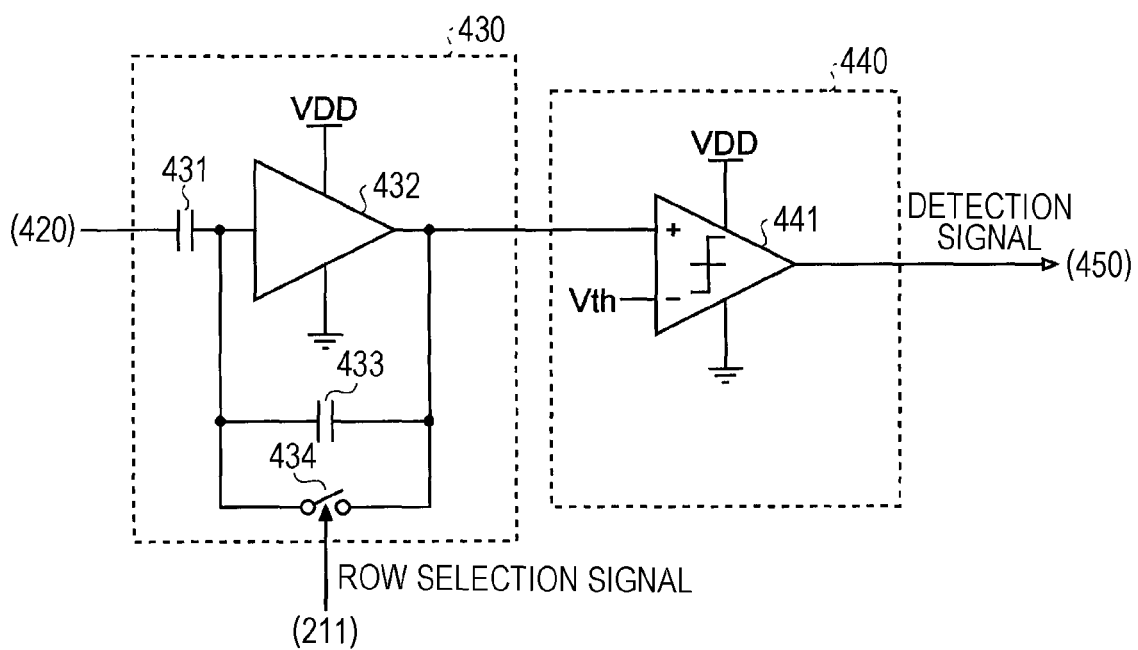
FIG. 7 is a circuit diagram illustrating a schematic configuration example of a subtractor and a quantizer according to the first embodiment.

FIG. 7 is a circuit diagram illustrating a schematic configuration example of the subtractor and the quantizer according to the first embodiment. As illustrated in FIG. 7, the subtractor 430 is provided with capacitors 431 and 433, an inverter 432, and a switch 434. Furthermore, the quantizer 440 is provided with a comparator 441.

One end of the capacitor 431 is connected to an output terminal of the buffer 420 and the other end thereof is connected to an input terminal of the inverter 432. The capacitor 433 is connected in parallel with the inverter 432.

The switch 434 opens/closes a path connecting both the ends of the capacitor 433 according to the row drive signal.

The inverter 432 inverts the voltage signal input via the capacitor 431. The inverter 432 outputs the inverted signal to a non-inverting input terminal (+) of the comparator 441.

When the switch 434 is turned on, a voltage signal Vinit is input to a side of the buffer 420 of the capacitor 431. Furthermore, the opposite side becomes a virtual grounding terminal. Potential of this virtual grounding terminal is set to zero for convenience. At that time, potential Qinit accumulated in the capacitor 431 is expressed by following expression (1) when capacitance of the capacitor 431 is set to C1. In contrast, since both the ends of the capacitor 433 are short-circuited, an accumulated charge thereof is zero.

$$Q\text{init} = C1 \times V\text{init} \tag{1}$$

Next, considering a case where the switch 434 is turned off and the voltage on the side of the buffer 420 of the capacitor 431 changes to Vafter, a charge Qafter accumulated in the capacitor 431 is expressed by following expression (2).

$$Q\text{after} = C1 \times V\text{after} \tag{2}$$

In contrast, a charge Q2 accumulated in the capacitor 433 is expressed by following expression (3) when an output voltage is set to Vout.

$$Q2 = -C2 \times V\text{out} \tag{3}$$

At that time, a total charge amount of the capacitors 431 and 433 does not change, so that following expression (4) holds.

$$Q\text{init} = Q\text{after} + Q2 \tag{4}$$

By substituting expressions (1) to (3) into expression (4) and transforming, following expression (5) is obtained.

$$V\text{out} = -(C1/C2) \times (V\text{after} - V\text{init}) \tag{5}$$

Expression (5) expresses a subtraction operation of the voltage signal, and a gain of a subtraction result is C1/C2. Since it is generally desired to maximize the gain, it is preferable to design C1 larger and C2 smaller. In contrast, if C2 is too small, kTC noise increases and a noise characteristic might be deteriorated, so that a reduction in capacitance of C2 is limited to a range in which the noise may be allowed. Furthermore, since the address event detection unit 400 including the subtractor 430 is mounted for each unit pixel, there is a limitation in area in the capacitance C1 and the capacitance C2. In consideration of them, values of the capacitance C1 and the capacitance C2 are determined.

The comparator 441 compares the voltage signal from the subtractor 430 with a predetermined threshold voltage Vth applied to an inverting input terminal (−). The comparator 441 outputs a signal indicating a comparison result to the transfer unit 450 as the detection signal.

Furthermore, a gain A of an entire address event detection unit 400 described above is expressed by following expression (6) when a conversion gain of the current-voltage conversion unit 410 is set to $CG_{log}$ and a gain of the buffer 420 is set to '1'.

[Mathematical Expression 1]

$$A = \frac{CG_{log} \cdot C1}{C2} \sum_{n=1}^{N} i_{photo\_n} \qquad (6)$$

In expression (6), $i_{photo\_n}$ represents a photocurrent of an n-th unit pixel, and its unit is, for example, ampere (A). N represents the number of unit pixels 310 in the pixel block and is '1' in this embodiment.

1.5 Application Example to Mobile Body

The object detection device 1 described above may be applied to various products. For example, this may be mounted on any type of mobile body such as an automobile, an electric automobile, a hybrid electric automobile, a motorcycle, a bicycle, a personal mobility, an airplane, a drone, a ship, and a robot.

Figure 8:
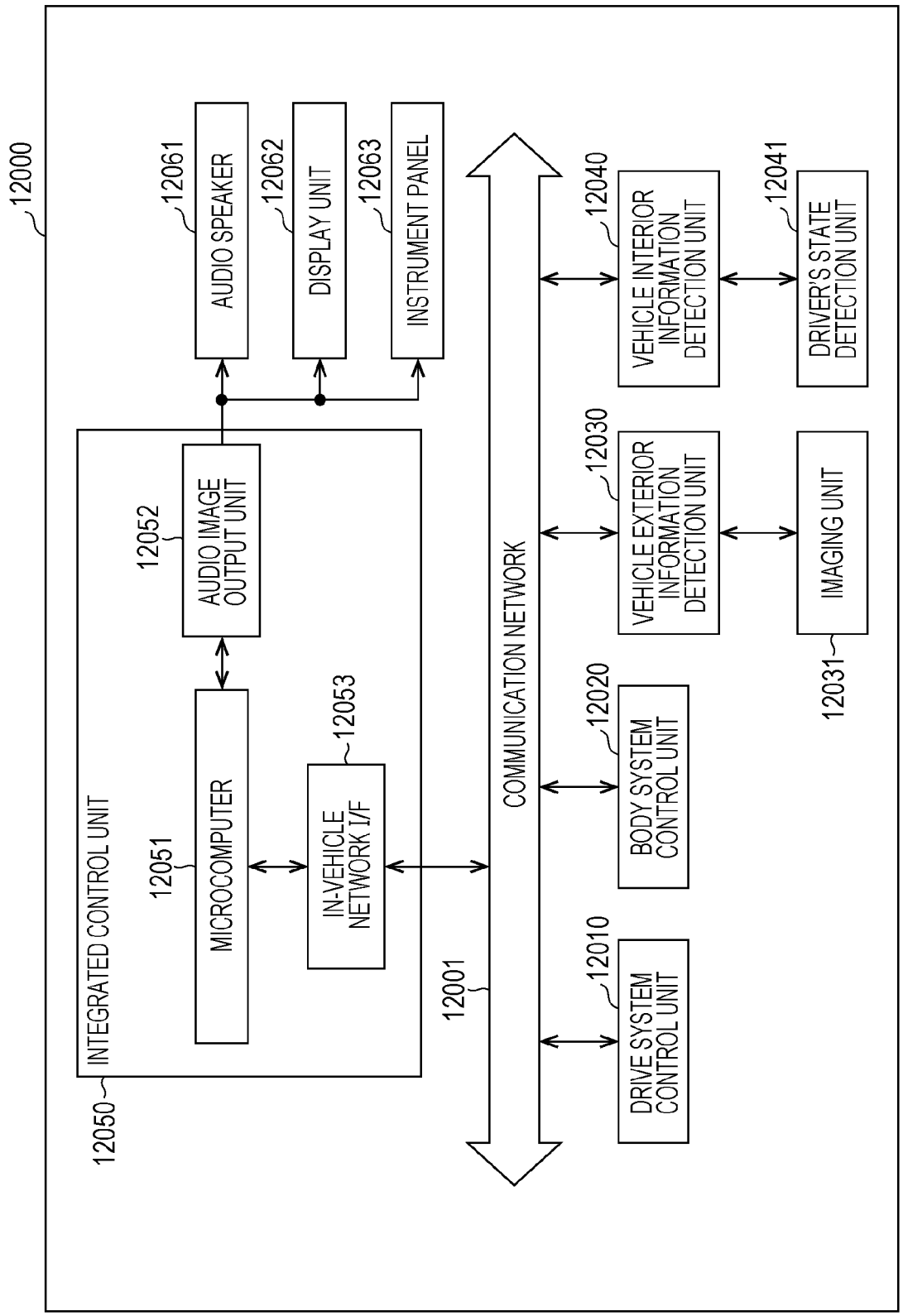
FIG. 8 is a block diagram illustrating a schematic configuration example of a vehicle control system that is an example of a mobile body control system according to the first embodiment.

FIG. 8 is a block diagram illustrating a schematic configuration example of a vehicle control system that is an example of a mobile body control system according to the first embodiment.

As illustrated in FIG. 8, a vehicle control system 12000 is provided with a plurality of electronic control units connected to one another via a communication network 12001. In the example illustrated in FIG. 8, the vehicle control system 12000 is provided with a drive system control unit 12010, a body system control unit 12020, a vehicle exterior information detection unit 12030, a vehicle interior information detection unit 12040, and an integrated control unit 12050. Furthermore, a microcomputer 12051, an audio image output unit 12052, and an in-vehicle network interface (I/F) 12053 are illustrated as functional configurations of the integrated control unit 12050.

The drive system control unit 12010 controls an operation of a device related to a drive system of a vehicle according to various programs. For example, the drive system control unit 12010 serves as a control device of a driving force generating device for generating driving force of the vehicle such as an internal combustion engine or a driving motor, a driving force transmitting mechanism for transmitting the driving force to wheels, a steering mechanism for adjusting a rudder angle of the vehicle, a braking device for generating braking force of the vehicle and the like.

The body system control unit 12020 controls operations of various devices mounted on a vehicle body according to the various programs. For example, the body system control unit 12020 serves as a control device of a keyless entry system, a smart key system, a power window device, or various lights such as a headlight, a backing light, a brake light, a blinker, or a fog light. In this case, a radio wave transmitted from a portable device that substitutes for a key or signals of various switches may be input to the body system control unit 12020. The body system control unit 12020 receives an input of the radio wave or signals and controls a door locking device, a power window device, the lights and the like of the vehicle.

The vehicle exterior information detection unit 12030 detects information outside the vehicle equipped with the vehicle control system 12000. For example, an imaging unit 12031 is connected to the vehicle exterior information detection unit 12030. The vehicle exterior information detection unit 12030 allows the imaging unit 12031 to obtain information outside the vehicle and receives obtained data. The vehicle exterior information detection unit 12030 may perform detection processing of objects such as a person, a vehicle, an obstacle, a sign, or a character on a road surface or distance detection processing on the basis of the received data.

The imaging unit 12031 may be an image sensor that outputs an electric signal as an image, or may be a ranging sensor that outputs the same as ranging information. Furthermore, the light received by the imaging unit 12031 may be visible light or invisible light such as infrared light.

The imaging unit 12031 is provided with, for example, a plurality of imaging units 12101 to 12105 to be described later (refer to FIG. 9). The above-described DVS 200 is used for at least one of the plurality of imaging units 12101 to 12105. The DVS 200 and the vehicle exterior information detection unit 12030 connected thereto form the object detection device 1 according to the first embodiment. In this case, the vehicle exterior information detection unit 12030 and/or the microcomputer 12051 serve as the data processing unit 120.

The vehicle interior information detection unit 12040 detects information inside the vehicle. The vehicle interior information detection unit 12040 is connected to, for example, a driver's state detection unit 12041 that detects a state of a driver. The driver's state detection unit 12041 includes, for example, a camera that images the driver, and the vehicle interior information detection unit 12040 may calculate a fatigue level or a concentration level of the driver or may determine whether or not the driver is dozing on the basis of detection information input from the driver's state detection unit 12041.

The microcomputer 12051 may perform an arithmetic operation of a control target value of the driving force generating device, the steering mechanism, or the braking device on the basis of the information inside and outside the vehicle obtained by the vehicle interior information detection unit 12040 or the vehicle exterior information detection unit 12030, and output a control instruction to the drive system control unit 12010. For example, the microcomputer 12051 may perform cooperative control for realizing functions of advanced driver assistance system (ADAS) including collision avoidance or impact attenuation of the vehicle, following travel based on an inter-vehicular distance, vehicle speed maintaining travel, vehicle collision warning, vehicle lane departure warning or the like.

Furthermore, the microcomputer 12051 may perform the cooperative control for realizing automatic driving and the like to autonomously travel independent from the operation of the driver by controlling the driving force generating device, the steering mechanism, the braking device or the like on the basis of the information around the vehicle obtained by the vehicle exterior information detection unit 12030 or the vehicle interior information detection unit 12040.

Furthermore, the microcomputer 12051 may output the control instruction to the body system control unit 12020 on the basis of the information outside the vehicle obtained by the vehicle exterior information detection unit 12030. For example, the microcomputer 12051 may perform the cooperative control for realizing glare protection such as controlling the headlight according to a position of a preceding vehicle or an oncoming vehicle detected by the vehicle exterior information detection unit 12030 to switch a high beam to a low beam.

The audio image output unit 12052 transmits at least one of audio or image output signal to an output device capable of visually or audibly notifying an occupant of the vehicle or the outside the vehicle of the information. In the example in FIG. 72, as the output device, an audio speaker 12061, a display unit 12062, and an instrument panel 12063 are illustrated. The display unit 12062 may include at least one of an on-board display or a head-up display, for example.

1.6 Arrangement Example of DVS

Figure 9:
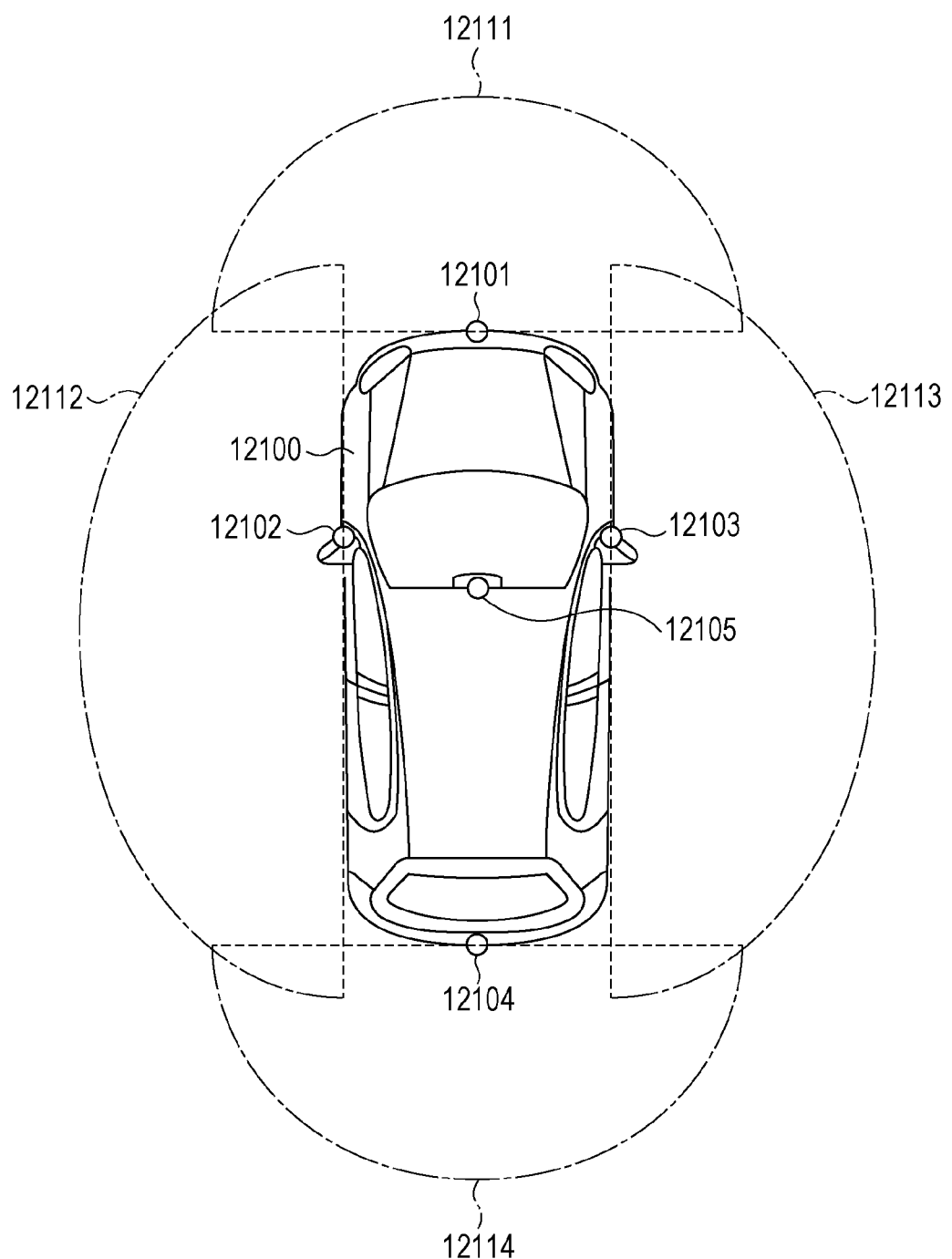
FIG. 9 is a view illustrating an example of an installation position of the DVS according to the first embodiment with respect to a vehicle.

FIG. 9 is a view illustrating an example of an installation position of the DVS according to the first embodiment with respect to the vehicle. In FIG. 9, as the imaging unit 12031, a total of five imaging units including the imaging units 12101, 12102, 12103, 12104, and 12105 are provided for the vehicle 12100. At least one of the imaging units 12101 to 12105 includes the DVS 200. For example, the DVS 200 is used for the imaging unit 12101 that images an area in front of the vehicle 12100.

The imaging units 12101, 12102, 12103, 12104, and 12105 are provided in positions such as, for example, a front nose, a side mirror, a rear bumper, a rear door, and an upper portion of a windshield in a vehicle interior of the vehicle 12100. The imaging unit 12101 provided on the front nose and the imaging unit 12105 provided in the upper portion of the windshield in the vehicle interior principally obtain images of the area in front of the vehicle 12100. The imaging units 12102 and 12103 provided on the side mirrors principally obtain images of the sides of the vehicle 12100. The imaging unit 12104 provided on the rear bumper or the rear door principally obtains an image of an area behind the vehicle 12100. The imaging unit 12105 provided in the upper portion of the windshield in the vehicle interior is principally used for detecting a preceding vehicle, a pedestrian, an obstacle, a traffic light, a traffic sign, a lane or the like.

Furthermore, in FIG. 9, an example of imaging ranges of the imaging units 12101 to 12104 is illustrated. An imaging range 12111 indicates the imaging range of the imaging unit 12101 provided on the front nose, imaging ranges 12112 and 12113 indicate the imaging ranges of the imaging units 12102 and 12103 provided on the side mirrors, and an imaging range 12114 indicates the imaging range of the imaging unit 12104 provided on the rear bumper or the rear door. For example, image data imaged by the imaging units 12101 to 12104 are superimposed, so that an overlooking image of the vehicle 12100 as seen from above is obtained.

At least one of the imaging units 12101 to 12104 may have a function of obtaining distance information. For example, at least one of the imaging units 12101 to 12104 may be a stereo camera including a plurality of imaging elements, or may be an imaging element including pixels for phase difference detection.

For example, the microcomputer 12051 (refer to FIG. 8) may extract especially a closest solid object on a traveling path of the vehicle 12100, the solid object traveling at a predetermined speed (for example, 0 km/h or higher) in a direction substantially the same as that of the vehicle 12100 as the preceding vehicle by obtaining a distance to each solid object in the imaging ranges 12111 to 12114 and a change in time of the distance (relative speed relative to the vehicle 12100) on the basis of the distance information obtained from the imaging units 12101 to 12104. Moreover, the microcomputer 12051 may set the inter-vehicular distance to be secured in advance from the preceding vehicle, and may perform automatic brake control (including following stop control), automatic acceleration control (including following start control) and the like. In this manner, it is possible to perform the cooperative control for realizing the automatic driving and the like to autonomously travel independent from the operation of the driver.

For example, the microcomputer 12051 may extract solid object data regarding the solid object while sorting the same into a motorcycle, a standard vehicle, a large-sized vehicle, a pedestrian, and other solid objects such as a utility pole on the basis of the distance information obtained from the imaging units 12101 to 12104 and use for automatically avoiding obstacles. For example, the microcomputer 12051 discriminates the obstacles around the vehicle 12100 into an obstacle visible to a driver of the vehicle 12100 and an obstacle difficult to see. Then, the microcomputer 12051 determines a collision risk indicating a degree of risk of collision with each obstacle, and when the collision risk is equal to or higher than a set value and there is a possibility of collision, this may perform driving assistance for avoiding the collision by outputting an alarm to the driver via the audio speaker 12061 and the display unit 12062 or performing forced deceleration or avoidance steering via the drive system control unit 12010.

At least one of the imaging units 12101 to 12104 may be an infrared camera that detects infrared light. For example, the microcomputer 12051 may recognize a pedestrian by determining whether or not there is a pedestrian in the images taken by the imaging units 12101 to 12104. Such pedestrian recognition is carried out, for example, by a procedure of extracting feature points in the images taken by the imaging units 12101 to 12104 as the infrared cameras, and a procedure of performing pattern matching processing on a series of feature points indicating an outline of an object to discriminate whether or not this is a pedestrian. When the microcomputer 12051 determines that there is the pedestrian in the images taken by the imaging units 12101 to 12104 and recognizes the pedestrian, the audio image output unit 12052 controls the display unit 12062 to superimpose a rectangular contour for emphasis on the recognized pedestrian to display. Furthermore, the audio image output unit 12052 may control the display unit 12062 to display an icon and the like indicating the pedestrian in a desired position.

1.7 Object Detection Operation Example

Figure 10:
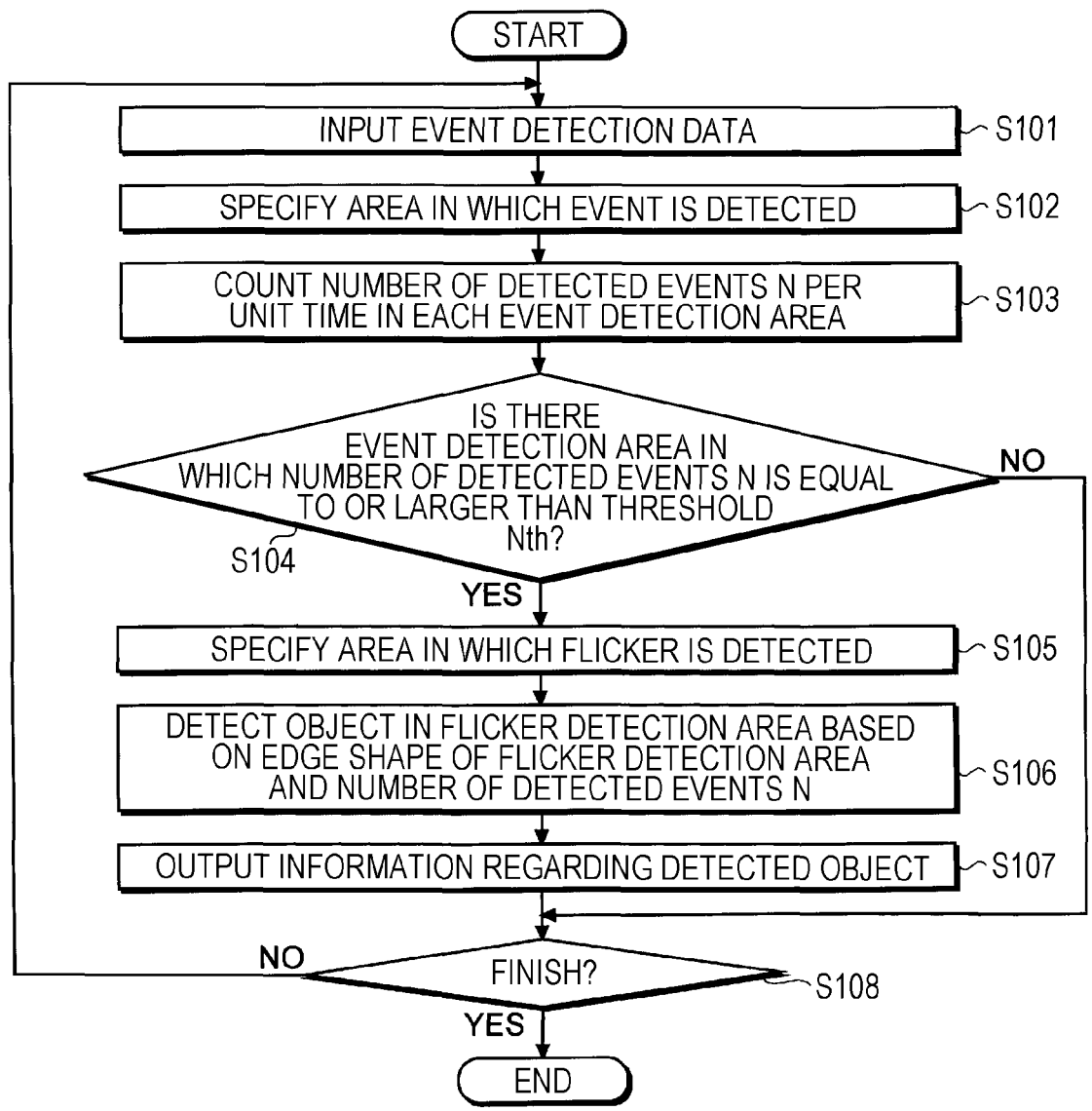
FIG. 10 is a flowchart illustrating an example of an object detection operation executed by the object detection device according to the first embodiment.

Next, an operation example of the object detection device 1 according to the first embodiment is described. FIG. 10 is a flowchart illustrating an example of an object detection operation executed by the object detection device according to the first embodiment. Note that, in the following description, attention is focused on an operation of the data processing unit 120.

As illustrated in FIG. 10, in this operation, first, the data processing unit 120 inputs the event detection data from the DVS 200 (step S101). Note that, since the DVS 200 operates asynchronously as described above, the event detection data is input from the DVS 200 to the data processing unit 120 as needed when the occurrence of the address event is detected.

In contrast, the data processing unit 120 specifies one or more areas (hereinafter, referred to as event detection areas) in which the occurrence of the address event is detected on the basis of the address information included in the input event detection data (step S102). For example, in a case where the object illustrated in FIG. 1 is included within an angle of view of the DVS 200, the data processing unit 120 specifies a region R1 of the traffic light 51 and regions R2 and R3 of the taillight, the brake light and the like of the preceding vehicles 52 and 53. Note that, at step S102, for example, one or more event detection areas in which the occurrence of the address event is detected may be specified on the basis of one or more pieces of event detection data input within a predetermined time (for example, 1 millisecond (ms)).

Next, the data processing unit 120 counts the number of address events the occurrence of which is detected per unit time (for example, 1 second) (hereinafter, referred to as the number of detected events) N for each event detection area specified at step S102 (step S103). Note that the number of detected events N is a value used to determine whether or not each event detection area includes the flicker component, and is a characteristic value corresponding to the frequency of the flicker component. As the number of detected events N, a value counted for each address (that is, pixel) belonging to each event detection area may be used, or a maximum value, an average value and the like in each event detection area of values counted for each address may be used.

Next, the data processing unit 120 determines whether or not there is the event detection area in which the number of detected events N is equal to or larger than a threshold Nth set in advance (step S104). In a case where there is no event detection area in which the number of detected events N is equal to or larger than the threshold Nth (NO at step S104), the data processing unit 120 determines that no flickering object is detected, and proceeds to step S108.

In contrast, in a case where there is the event detection area in which the number of detected events N is equal to or larger than the threshold Nth (YES at step S104), the data processing unit 120 specifies an area in which the flicker is detected from the above-described one or more event detection areas (hereinafter, referred to as a flicker detection area) (step S105).

Next, the data processing unit 120 detects an object imaged in each flicker detection area on the basis of an edge shape of the flicker detection area specified at step S105 and the number of detected events N counted for the flicker detection area (step S106).

Note that the object in each flicker detection area may be detected on the basis of, for example, the edge shape of the object specified from the address information, the characteristic such as the frequency and the duty ratio of the flicker component specified from the number of detected events N and the like. For example, it is possible to detect the object by registering a correspondence relationship between the edge shape, the flicker characteristic and the like and the object in the memory 121 and performing pattern matching between the detected edge shape, flicker characteristic and the like and the edge shape, the flicker characteristic and the like of the registered object. Alternatively, it is also possible to detect the object by machine learning using the edge shape, the flicker characteristic and the like as inputs.

Next, the data processing unit 120 outputs a result of the object detection processing executed as described above to, for example, the integrated control unit 12050 via the communication network 12001 (step S107), and proceeds to step S108.

At step S108, the data processing unit 120 determines whether or not to finish this operation, and in a case of finishing (YES at step S108), this finishes this operation. In contrast, in a case of continuing (NO at step S108), the data processing unit 120 returns to step S101 and executes the subsequent operation.

1.8 Action and Effect

As described above, according to this embodiment, it becomes possible to detect the object in consideration of not only the edge shape of the object but also the characteristic of the flicker generated by the object and the like. Accordingly, it becomes possible to detect the object at a higher speed and with higher accuracy.

2. Second Embodiment

Next, a second embodiment is described in detail with reference to the drawings. Note that, in the following description, the configuration and operation similar to those of the first embodiment are cited, and the description thereof is not repeated.

In the first embodiment described above, the case of detecting the object that emits the flicker component using the event detection data obtained from the DVS 200 is exemplified. In contrast, in the second embodiment, a case of detecting an object that emits a flicker component using image data obtained by a normal image sensor in addition to event detection data is described with an example.

Figure 11:
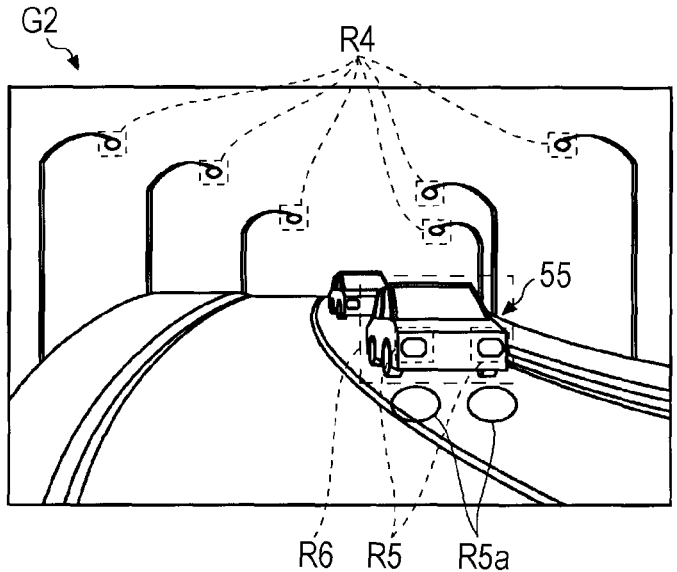
FIG. 11 is a view for explaining a flicker component detected within an angle of view.

For example, as illustrated in FIG. 11, in a case where a road surface is wet with rain and the like, light output from a headlight of an oncoming vehicle 55 is reflected on the road surface; in this case, not only a region R5 of the headlight but also a region R5a on the road surface reflecting the light of the headlight has a flicker component in an angle of view G2. Therefore, in object detection based on only the flicker component, there is a possibility of occurrence of erroneous detection such as detection of an object on the road surface on which nothing originally exists. Note that, in FIG. 11, a region R4 corresponding to a street light is also detected as a region having the flicker component.

Therefore, in this embodiment, by combining the event detection data and the image data, occurrence of erroneous detection is suppressed and more accurate object detection becomes possible.

2.1 Configuration Example of Object Detection Device (or System)

Figure 12:
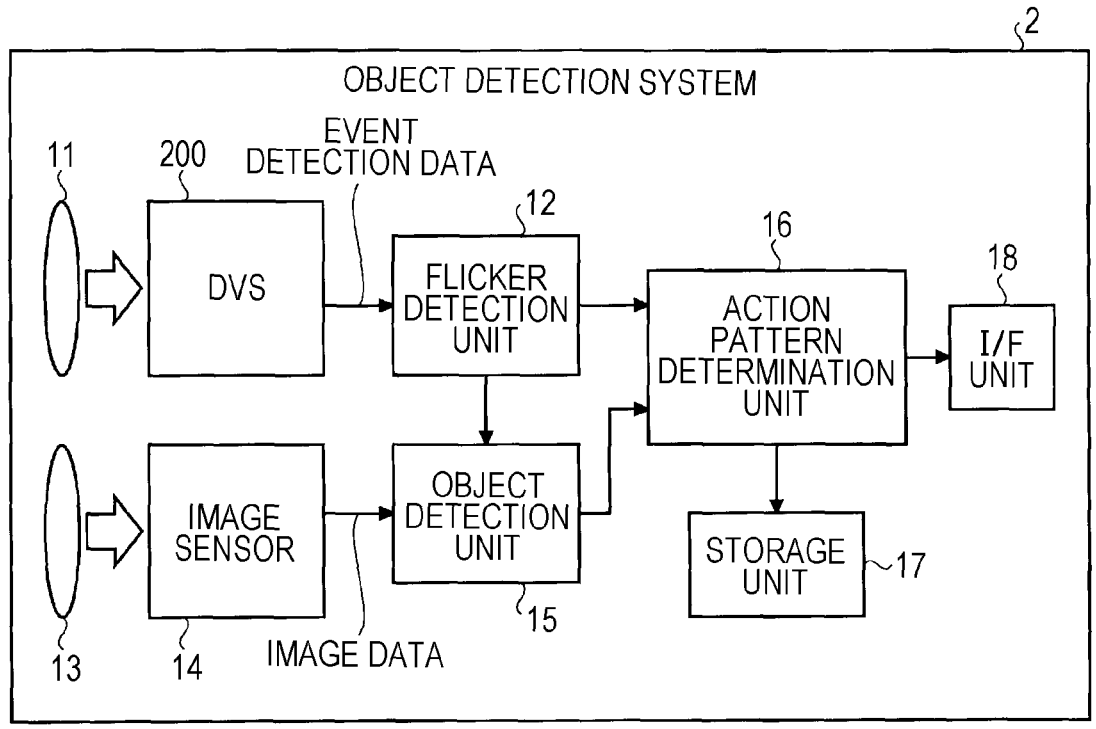
FIG. 12 is a block diagram illustrating a schematic configuration example of an object detection device (or system) according to a second embodiment.

FIG. 12 is a block diagram illustrating a schematic configuration example of an object detection device (or system) according to the second embodiment. As illustrated in FIG. 12, an object detection device 2 is provided with an imaging lens 110, a DVS 200, a flicker detection unit 12, an imaging lens 13, an image sensor (second solid-state imaging device) 14, an object detection unit 15, an action pattern determination unit 16, a storage unit 17, and an interface (I/F) unit 18. In this configuration, the imaging lens 11 and the DVS 200 may be similar to the imaging lens 11 and the DVS 200 according to the first embodiment.

As is the case with the imaging lens 11, the imaging lens 13 is an example of an optical system that condenses incident light and forms an image thereof on a light receiving surface of the image sensor 14. The light receiving surface may be a surface on which photoelectric conversion elements are arranged in the image sensor 14.

The image sensor 14 may be various image sensors capable of obtaining image data such as a charge coupled device (CCD) image sensor and a complementary metal-oxide-semiconductor (CMOS) image sensor, for example. The image sensor 14 has, for example, a configuration included in an imaging unit 12031 in FIG. 8, and is mounted on a vehicle 12100 so as to image substantially the same angle of view as that of the DVS 200.

The flicker detection unit 12 specifies one or more flicker detection areas on the basis of, for example, the event detection data input from the DVS 200. The flicker detection unit 12 may be, for example, the data processing unit 120 in the first embodiment. In this case, the flicker detection unit 12 may not only specify the flicker detection area but also detect an object imaged in each flicker detection area.

The object detection unit 15 detects the object imaged in each flicker detection area by using the flicker detection area detected by the flicker detection unit 12 and the image data input from the image sensor 14.

The action pattern determination unit 16 determines an action pattern of the vehicle 12100 on the basis of, for example, the object detected by the flicker detection unit 12 or the object detected by the object detection unit 15. The action pattern determination unit 16 may be a microcomputer 12051 in FIG. 8, or may be a computer different from the microcomputer 12051, for example.

The storage unit 17 stores various programs and data necessary for the action pattern determination unit 16 to determine the action pattern of the vehicle 12100.

The I/F unit 18 is, for example, when the action pattern determination unit 16 is the computer different from the microcomputer 12051, an interface for transmitting and receiving data to and from an integrated control unit 12050 via a communication network 12001. However, in a case where the action pattern determination unit 16 is the microcomputer 12051, the I/F unit 18 corresponds to, for example, an in-vehicle network I/F 12053.

2.2 Object Detection Operation Example

Figure 13:
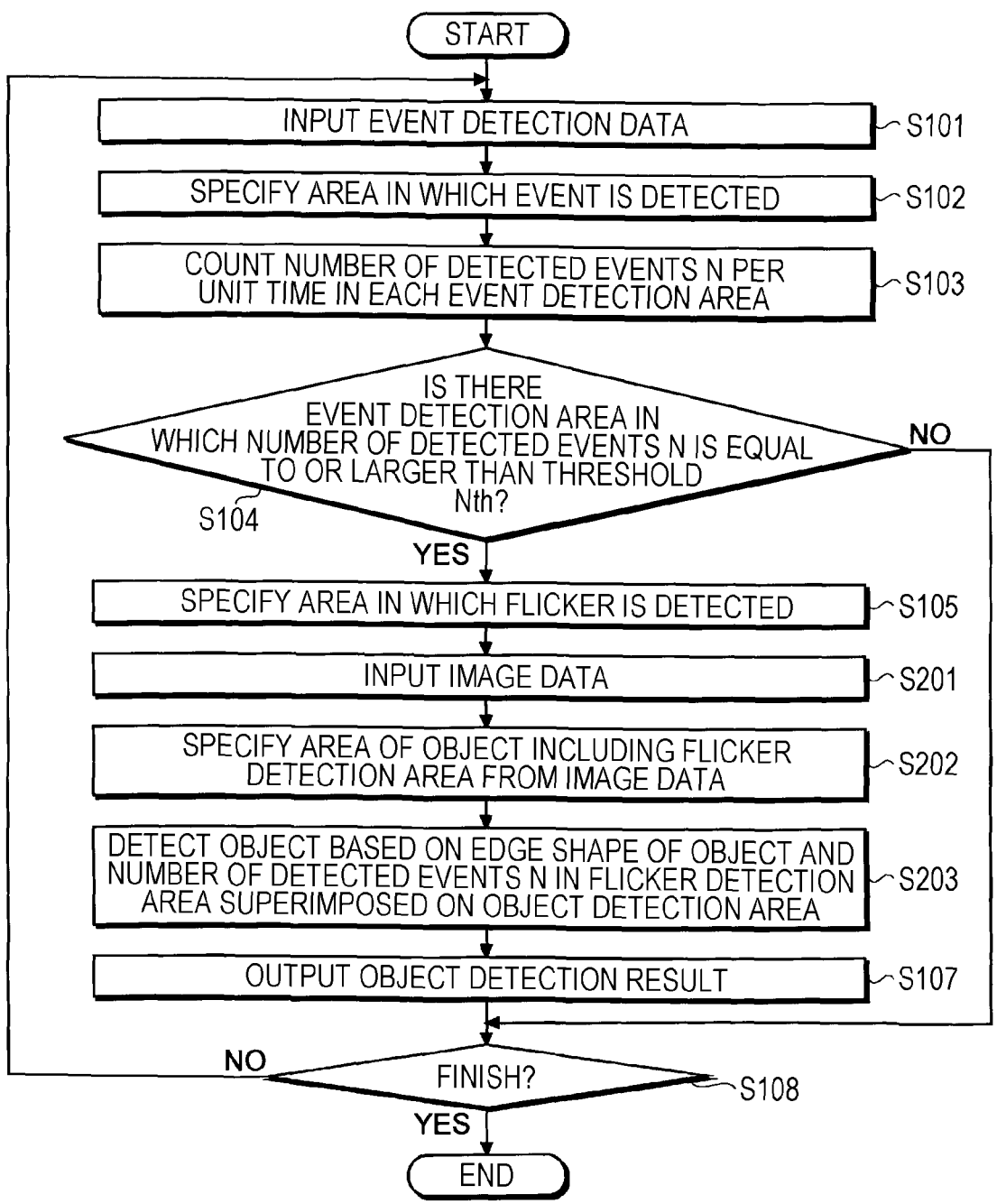
FIG. 13 is a flowchart illustrating an example of an object detection operation executed by the object detection device according to the second embodiment.

Next, an operation example of the object detection device 2 according to the second embodiment is described. FIG. 13 is a flowchart illustrating an example of an object detection operation executed by the object detection device according to the second embodiment. Note that, in the following description, an operation similar to the operation described with reference to FIG. 10 in the first embodiment is cited, and the description thereof is not repeated.

As illustrated in FIG. 13, in this operation, first, the flicker detection unit 12 executes an operation similar to the operation described at steps S101 to S105 in FIG. 10 in the first embodiment, thereby specifying one or more flicker detection areas. Note that region information (for example, address information) for specifying each flicker detection area is input from the flicker detection unit 12 to the object detection unit 15.

Next, the image data is input from the image sensor 14 to the object detection unit 15 to which the region information of the flicker detection area is input (step S201). Note that the image sensor 14 may periodically output the image data at a predetermined frame rate, or may output the image data at a timing indicated by the object detection unit 15 or a control unit 130 (refer to FIG. 1).

The object detection unit 15 to which the image data is input specifies an area of an object including the flicker detection area (hereinafter, referred to as an object detection area) in the input image data (step S202). For example, in the example illustrated in FIG. 11, a region of the vehicle 55 including the region R5 corresponding to the flicker detection area is specified as an object detection area R6. In contrast, since the region R5a corresponding to the flicker detection area is not included in a specific object, the object detection unit 15 does not specify the object detection area for the region R5a.

Next, the object detection unit 15 detects the object imaged in each object detection area on the basis of an edge shape of the object included in the object detection area in the image data specified at step S202 and the number of detected events N in the flicker detection area superimposed on the object detection area (step S203). Note that it is possible to use pattern matching and machine learning for object detection, for example, as at step S106 in FIG. 10.

Next, the object detection unit 15 outputs an object detection result to, for example, the integrated control unit 12050 via the communication network 12001 (step S107) as at step S107 and subsequent steps in FIG. 10, and thereafter, determines whether or not to finish this operation at step S108.

2.3 Action and Effect

As described above, according to this embodiment, the flicker detection area in which the flicker component is detected is masked by the object detection area specified from the image data. As a result, it becomes possible to reduce or avoid the occurrence of the erroneous detection such as the detection of the object on the road surface and the like on which nothing originally exists, so that it becomes possible to detect the object with higher accuracy.

Other configurations, operations, and effects may be similar to those of the above-described embodiment, so that the detailed description thereof is herein omitted.

2.4 Variation

In the second embodiment described above, the case of reducing or avoiding the occurrence of the erroneous detection by masking flicker information (for example, the flicker detection area and/or the number of detected events N) obtained from the event detection data with object information (for example, the object detection area) obtained from the image data is exemplified. However, a method of reducing/avoiding the erroneous detection by a combination of the flicker information and the object information is not limited to such a method. For example, it is also possible to reduce or avoid the erroneous detection by supporting object detection on the image data using the flicker information.

Figure 14:
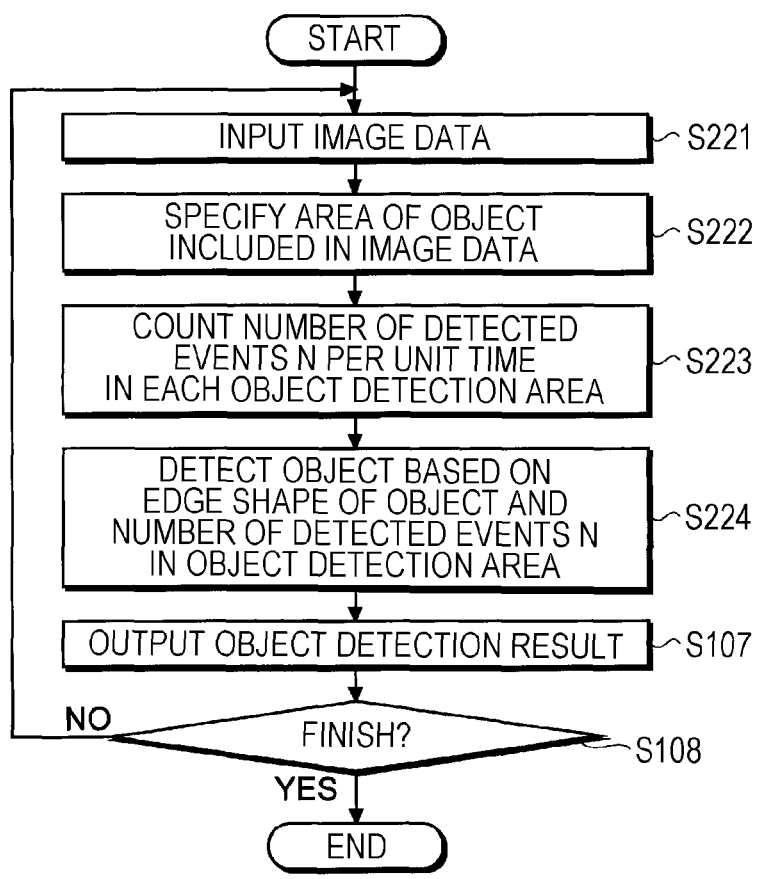
FIG. 14 is a flowchart illustrating an example of an object detection operation according to a variation of the second embodiment.

FIG. 14 is a flowchart illustrating an example of an object detection operation according to a variation of the second embodiment. As illustrated in FIG. 14, in this variation, first, image data is input to an object detection unit 15 (step S221). The object detection unit 15 to which the image data is input executes object detection processing on the input image data, thereby specifying one or more areas of an object (object detection areas) included in the image data (step S222). For example, in the example illustrated in FIG. 11, the object detection unit 15 specifies an object detection area R6 including a vehicle 55. Note that region information (for example, address information) for specifying each object detection area is input from the object detection unit 15 to a flicker detection unit 12.

Next, the flicker detection unit 12 counts the number of detected events N per unit time in each object detection area (step S223). Note that, as the number of detected events N, a value counted for each address (that is, pixel) belonging to each object detection area may be used, or a maximum value, an average value and the like in each area of the values counted for each address may be used. Note that the number of detected events N for each object detection area is input from the flicker detection unit 12 to the object detection unit 15.

Next, the object detection unit 15 detects the object imaged in each object detection area on the basis of an edge shape of the object included in the object detection area in the image data specified at step S222 and the number of detected events N in the object detection area (step S224). Note that it is possible to use pattern matching and machine learning for object detection, for example, as at step S106 in FIG. 10.

Next, the object detection unit 15 outputs an object detection result to, for example, the integrated control unit 12050 via the communication network 12001 (step S107) as at step S107 and subsequent steps in FIG. 10, and thereafter, determines whether or not to finish this operation at step S108.

According to the operation as described above, since the object detection with respect to the image data is supported by using the flicker information, it becomes possible to reduce or avoid occurrence of erroneous detection such as detection of an object on a road surface and the like on which nothing originally exists and perform the object detection with higher accuracy as in the second embodiment.

3. Third Embodiment

Next, a third embodiment is described in detail with reference to the drawings. Note that, in the following description, the configuration and operation similar to those of the above-described embodiments are cited, and the description thereof is not repeated.

For example, an object that emits a flicker component such as a traffic light, an electric bulletin board, or a vehicle light is not a point and has a certain region. In contrast, most of erroneous detections output from a DVS 200 are very small areas of one or several points.

Therefore, in this embodiment, a lower limit is set in a size of a region specified as a flicker detection area, and the area smaller the lower limit is not set as the flicker detection area, thereby reducing erroneous detection of an object and reducing a data amount to be processed in object detection processing.

A configuration example of an object detection device (or system) according to this embodiment may be similar to, for example, that of the object detection device 1 exemplified in the first embodiment or the object detection device 2 exemplified in the second embodiment.

3.1 Object Detection Operation Example

Figure 15:
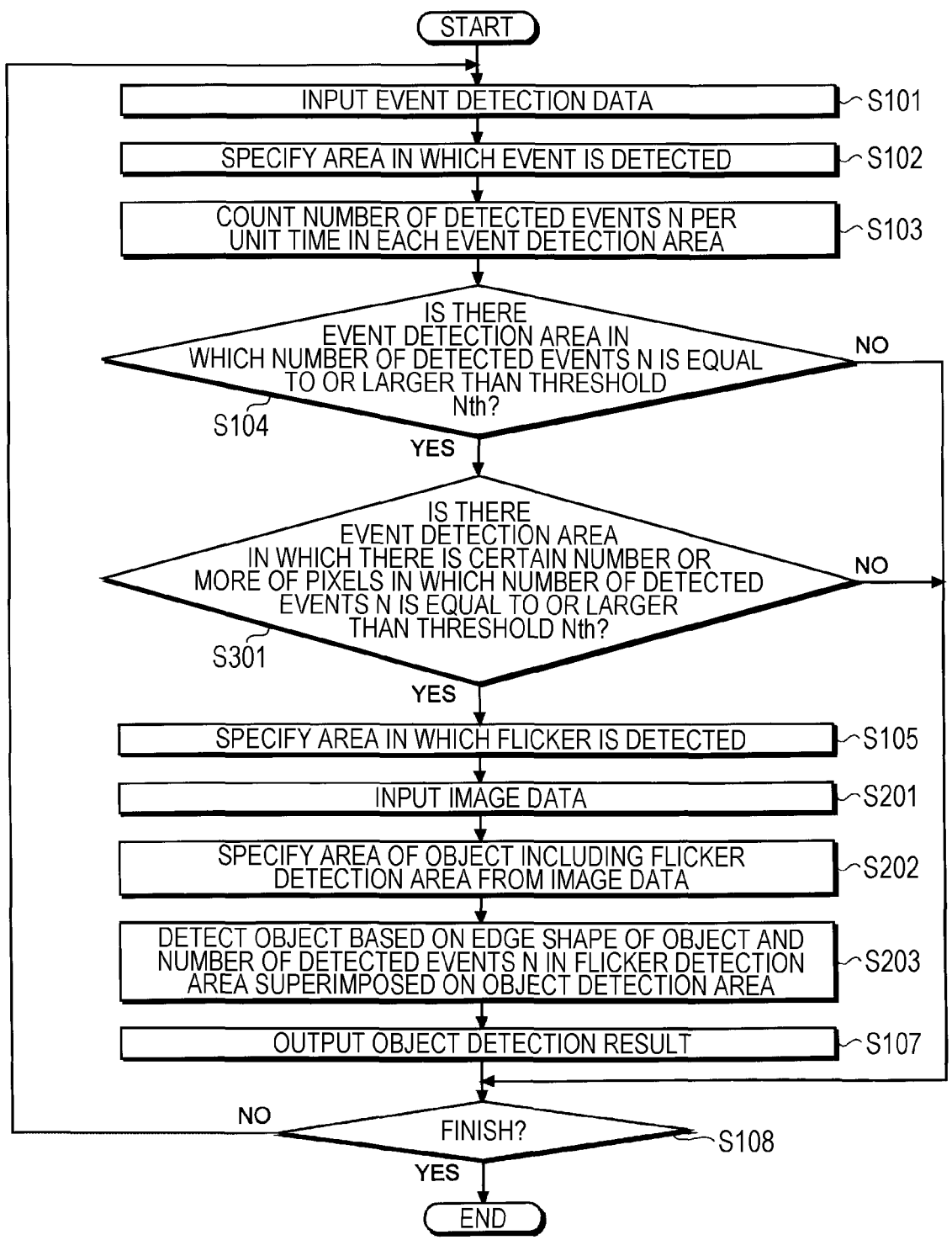
FIG. 15 is a flowchart illustrating an example of an object detection operation executed by an object detection device according to a third embodiment.

FIG. 15 is a flowchart illustrating an example of an object detection operation executed by an object detection device according to the third embodiment. Note that, in the following description, the operation similar to that of the above-described embodiments is cited, and the description thereof is not repeated. Furthermore, in the following description, a case based on the operation described with reference to FIG. 13 in the second embodiment is used is exemplified, but the embodiment as the base is not limited to the second embodiment, and may be other embodiments described above or later or a variation thereof.

As illustrated in FIG. 15, in the object detection operation according to this embodiment, for example, step S301 is added between step S104 and step S105 in the operation similar to the operation described with reference to FIG. 13 in the second embodiment.

At step S301, a flicker detection unit 12 determines whether or not there are a certain number or more of pixels (that is, addresses) in which the number of detected events N is equal to or larger than a threshold Nth in each event detection area specified at step S102. Note that the certain number may be, for example, a number corresponding to a size larger than an area size by erroneous detection of the address event.

In a case where there is no event detection area in which there are the certain number or more of pixels in which the number of detected events N is equal to or larger than the threshold Nth (NO at step S301), this operation proceeds to step S108. In contrast, in a case where this is present (YES at step S301), the flicker detection unit 12 specifies the event detection area in which there are the certain number or more of the pixels in which the number of detected events N is equal to or larger than the threshold Nth as the flicker detection area (step S105) and executes the subsequent operation.

3.2 Action and Effect

As described above, according to this embodiment, since the event detection area having a certain size or larger is specified as the flicker detection area, the erroneous detection of the object is reduced and object detection with higher accuracy becomes possible, and the data amount to be processed in the object detection processing is reduced and the object detection at a higher speed becomes possible.

Other configurations, operations, and effects may be similar to those of the above-described embodiment, so that the detailed description thereof is herein omitted.

4. Fourth Embodiment

Next, a fourth embodiment is described in detail with reference to the drawings. Note that, in the following description, the configuration and operation similar to those of the above-described embodiments are cited, and the description thereof is not repeated.

In the above-described embodiment, the occurrence of the address event is monitored without changing resolution between the flicker detection area and other areas. Furthermore, in the second and third embodiments, the image data at the same resolution is read from the flicker detection area and other areas.

In contrast, in the third embodiment, resolution when monitoring occurrence of an address event and/or resolution of image data read from an image sensor 14 are changed between a flicker detection area and other areas.

As a result, for example, it becomes possible to reduce a data processing amount for the area other than the flicker detection area, so that object detection at a higher speed becomes possible.

A configuration example of an object detection device (or system) according to this embodiment may be similar to, for example, that of the object detection device 1 exemplified in the first embodiment or the object detection device 2 exemplified in the second embodiment.

4.1 Object Detection Operation Example

Figure 16:
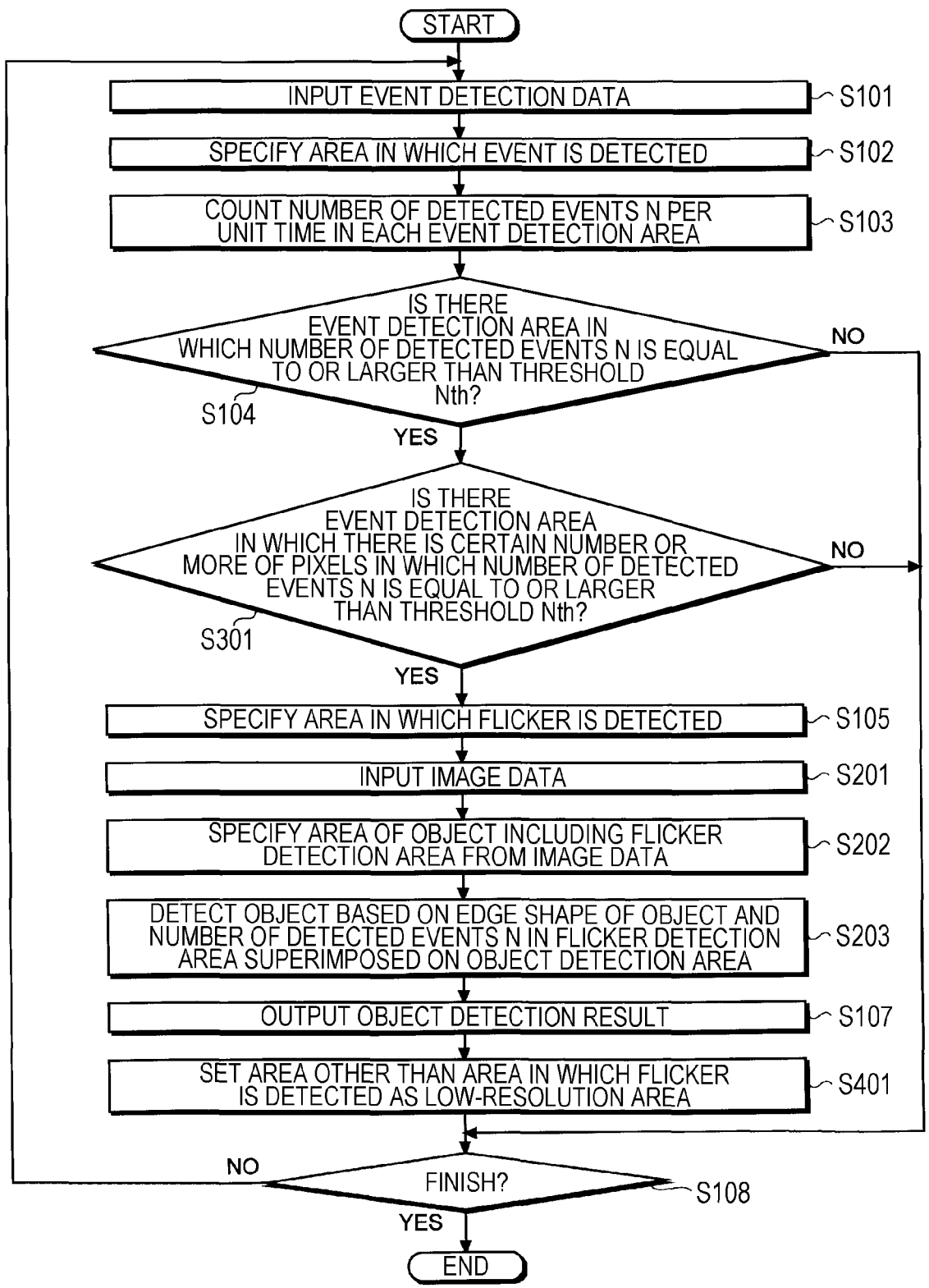
FIG. 16 is a flowchart illustrating an example of an object detection operation executed by an object detection device according to a fourth embodiment.

FIG. 16 is a flowchart illustrating an example of an object detection operation executed by the object detection device according to the fourth embodiment. Note that, in the following description, the operation similar to that of the above-described embodiments is cited, and the description thereof is not repeated. Furthermore, in the following description, a case based on the operation described with reference to FIG. 15 in the third embodiment is exemplified, but the embodiment as the base is not limited to the third embodiment, and may be other embodiments described above or later or a variation thereof.

As illustrated in FIG. 16, in the object detection operation according to this embodiment, for example, step S401 is added between step S107 and step S108 in the operation similar to the operation described with reference to FIG. 15 in the third embodiment.

At step S401, a flicker detection unit 12 sets the area other than the flicker detection area specified at step S105 as a low-resolution area. The setting of the low-resolution area may be executed on a control unit 130, for example.

In contrast, the control unit 130 sets the resolution when monitoring the occurrence of the address event to be low for the low-resolution area in a DVS 200. For example, the control unit 130 controls the DVS 200 so as to stop monitoring the occurrence of the address event for unit pixels 310 in odd-numbered rows and monitor the occurrence of the address event only for the unit pixels 310 in even-numbered rows for the low-resolution area in the DVS 200.

Furthermore, the control unit 130 lowers the resolution of the image data read from the low-resolution area in the image sensor 14. For example, as for the low-resolution area in the image sensor 14, the control unit 130 reads pixel signals only from the pixels in the odd-numbered rows to generate the image data.

4.2 Action and Effect

As described above, according to this embodiment, it becomes possible to reduce the data processing amount for the area other than the flicker detection area, so that the object detection at a higher speed becomes possible.

Other configurations, operations, and effects may be similar to those of the above-described embodiment, so that the detailed description thereof is herein omitted.

5. Fifth Embodiment

Next, a fifth embodiment is described in detail with reference to the drawings. Note that, in the following description, the configuration and operation similar to those of the above-described embodiments are cited, and the description thereof is not repeated.

In the fifth embodiment, an action pattern determination operation executed by the microcomputer 12051 or the action pattern determination unit 16 in the above-described embodiments is described with some examples. Note that, in the following description, it is assumed that the action pattern determination unit 16 executes the action pattern determination operation for the sake of clarity.

5.1 First Example

Figure 17:
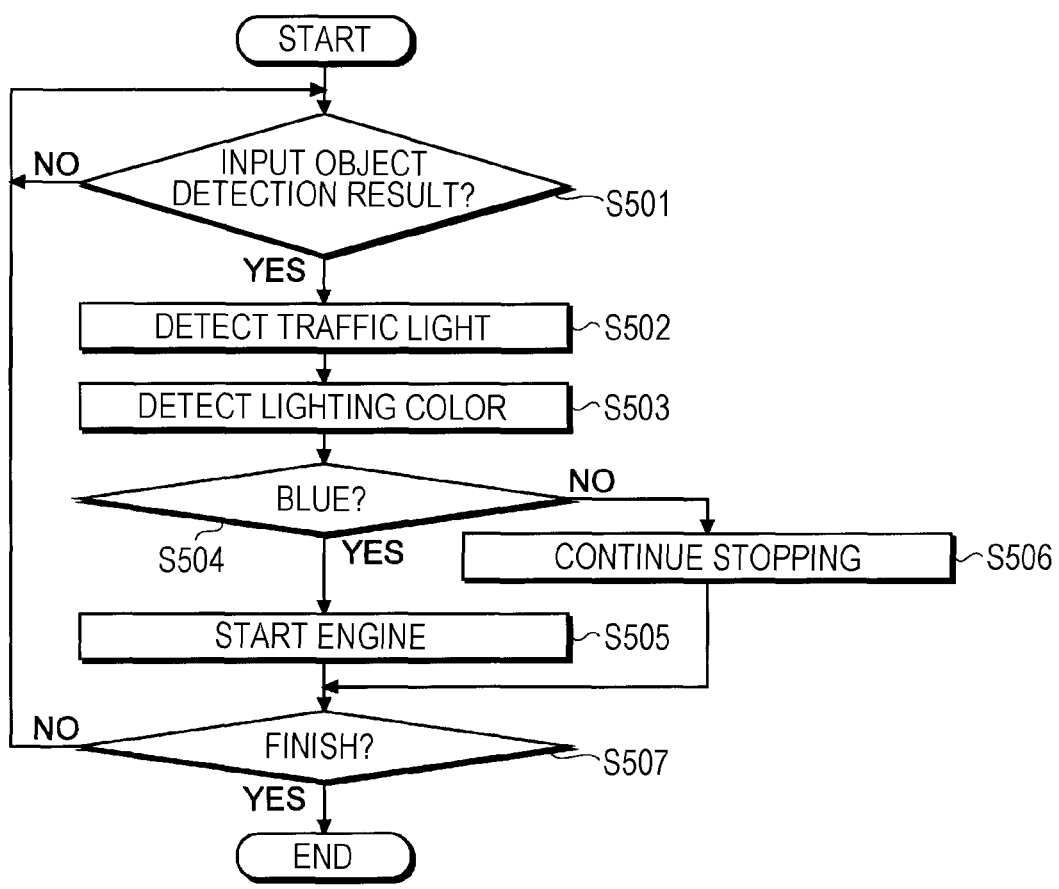
FIG. 17 is a flowchart illustrating an action pattern determination operation according to a first example of a fifth embodiment.

FIG. 17 is a flowchart illustrating an action pattern determination operation according to a first example. Note that, in the first example, a case where a traffic light is detected by the object detection device 1 or 2 according to the above-described embodiments while a vehicle 12100 waits at a traffic light is exemplified. Furthermore, at that time, it is assumed that an engine is automatically stopped by an idling stop system mounted on the vehicle 12100.

As illustrated in FIG. 17, in the first example, an action pattern determination unit 16 first stands by for an input of an object detection result from the object detection device 1 or 2 (NO at step S501), and when the object detection result is input (YES at step S501), this recognizes that the traffic light is detected on the basis of the object detection result (step S502).

Next, the action pattern determination unit 16 specifies a currently lighting color of the traffic light from the object detection result (step S503). Then, in a case where the currently lighting color is blue (YES at step S504), the action pattern determination unit 16 starts the engine (step S505), and proceeds to step S507. At that time, if an automatic driving function of the vehicle 12100 is active, the action pattern determination unit 16 may start forward movement and the like of the vehicle 12100 together with the start of the engine.

In contrast, in a case where the currently lighting color is a color other than blue, for example, red (NO at step S504), the action pattern determination unit 16 continues stopping (step S506), and proceeds to step S507.

At step S507, the action pattern determination unit 16 determines whether or not to finish this operation, and in a case of finishing (YES at step S507), this finishes this operation. In contrast, in a case of continuing (NO at step S507), the action pattern determination unit 16 returns to step S501 and executes the subsequent operation.

5.2 Second Example

Figure 18:
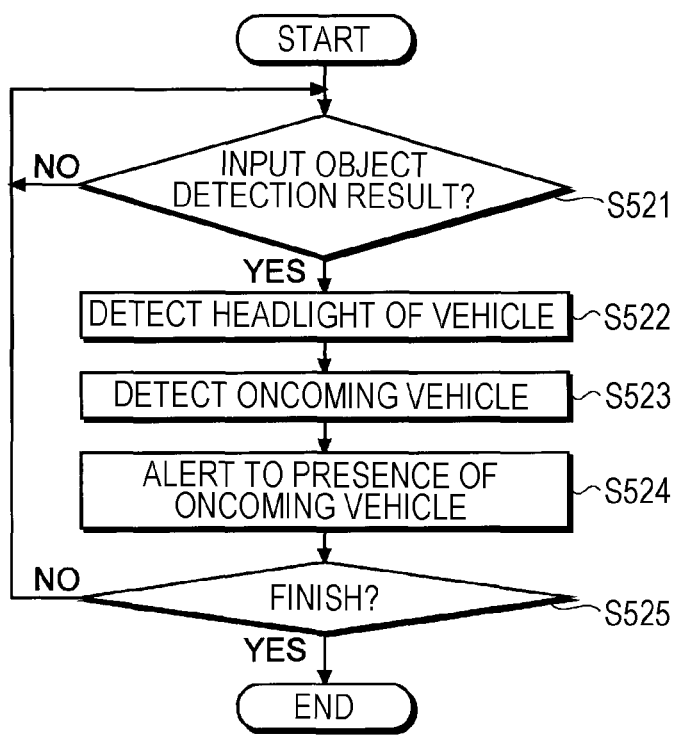
FIG. 18 is a flowchart illustrating an action pattern determination operation according to a second example of the fifth embodiment.

FIG. 18 is a flowchart illustrating an action pattern determination operation according to a second example. Note that, in the second example, a case where an oncoming vehicle is detected by the object detection device 1 or 2 according to the above-described embodiments while a vehicle 12100 travels is exemplified.

As illustrated in FIG. 18, in the second example, first, when an object detection result is input from the object detection device 1 or 2 (YES at step S521), an action pattern determination unit 16 detects a headlight of a vehicle being the oncoming vehicle on the basis of the object detection result (step S522). Subsequently, the action pattern determination unit 16 detects the oncoming vehicle from a region including the headlight in the object detection result (step S523).

When the presence of the oncoming vehicle is detected in this manner, the action pattern determination unit 16 drives an audio image output unit 12052 in FIG. 8, for example, to issue an alert notifying a driver of the presence of the oncoming vehicle from an audio speaker 12061 and/or displaying the presence of the oncoming vehicle on a display unit 12062 (step S524), and proceeds to step S525.

At step S525, the action pattern determination unit 16 determines whether or not to finish this operation, and in a case of finishing (YES at step S525), this finishes this operation. In contrast, in a case of continuing (NO at step S525), the action pattern determination unit 16 returns to step S521 and executes the subsequent operation.

5.3 Third Example

Figure 19:
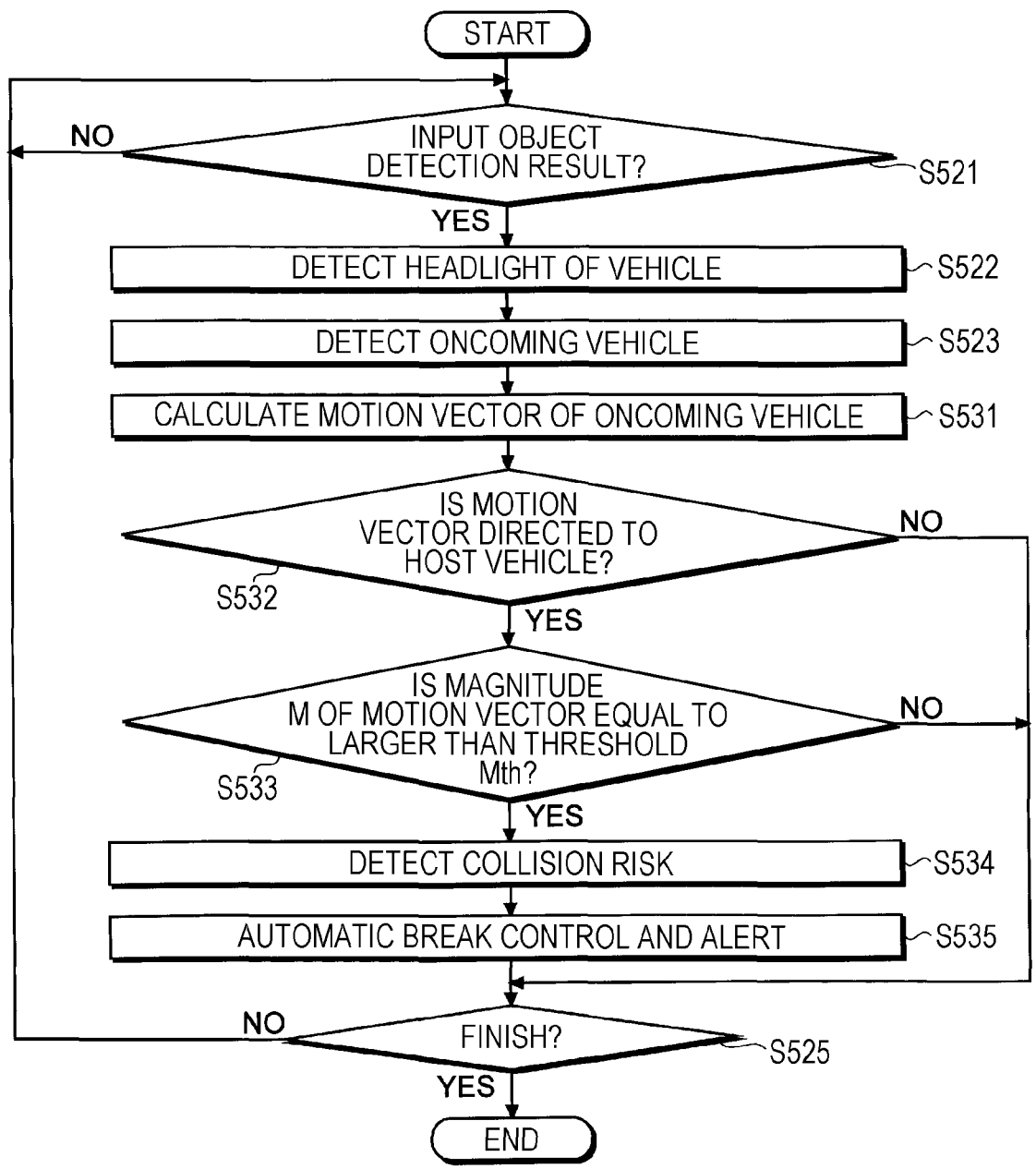
FIG. 19 is a flowchart illustrating an action pattern determination operation according to a third example of the fifth embodiment.

FIG. 19 is a flowchart illustrating an action pattern determination operation according to a third example. Note that, in the third example, another action pattern determination operation in a case where an oncoming vehicle is detected by the object detection device 1 or 2 according to the above-described embodiments while a vehicle 12100 travels is exemplified.

As illustrated in FIG. 19, in the third example, an action pattern determination unit 16 first detects the oncoming vehicle by executing an operation similar to the operation described at steps S521 to S523 in FIG. 18 in the second example.

Next, the action pattern determination unit 16 calculates a motion vector of the oncoming vehicle from an object detection result continuously input within a predetermined period (step S531). Note that, at step S531, for example, the center of gravity or the center of an object detection area corresponding to the oncoming vehicle may be calculated, and the motion vector of the oncoming vehicle may be calculated from a motion amount per unit time and a moving direction of the center of gravity or the center.

Next, the action pattern determination unit 16 determines whether or not the motion vector calculated at step S531 is directed to a host vehicle (vehicle 12100) (step S532). In a case where the motion vector is not directed to the host vehicle 12100 (NO at step S532), the action pattern determination unit 16 determines that a risk of collision is low or absent, and proceeds to step S525.

In contrast, in a case where the motion vector of the oncoming vehicle is directed to the host vehicle 12100 (YES at step S532), the action pattern determination unit 16 next determines whether or not magnitude M of the motion vector of the oncoming vehicle is equal to or larger than a threshold Mth set in advance (step S533). In a case where the magnitude M of the motion vector is smaller than the threshold Mth (step S533), the action pattern determination unit 16 determines that the risk of collision is low or absent, and proceeds to step S525.

Furthermore, in a case where the magnitude M of the motion vector is equal to or larger than the threshold Mth (YES at step S533), the action pattern determination unit 16 detects the risk of collision (step S534). Then, the action pattern determination unit 16 executes automatic brake control by controlling a drive system control unit 12010 in FIG. 8, for example, and drives an audio image output unit 12052 in FIG. 8, for example, thereby issuing an alert notifying a driver of the risk of collision with the oncoming vehicle from an audio speaker 12061 and/or displaying the risk of collision with the oncoming vehicle on a display unit 12062 (step S535), and proceeds to step S525.

At step S525, as in the second example, the action pattern determination unit 16 determines whether or not to finish this operation, and in a case of finishing (YES at step S525), this finishes this operation, and in a case of continuing (NO at step S525), this returns to step S521 and executes the subsequent operation.

5.4 Fourth Example

Figure 20:
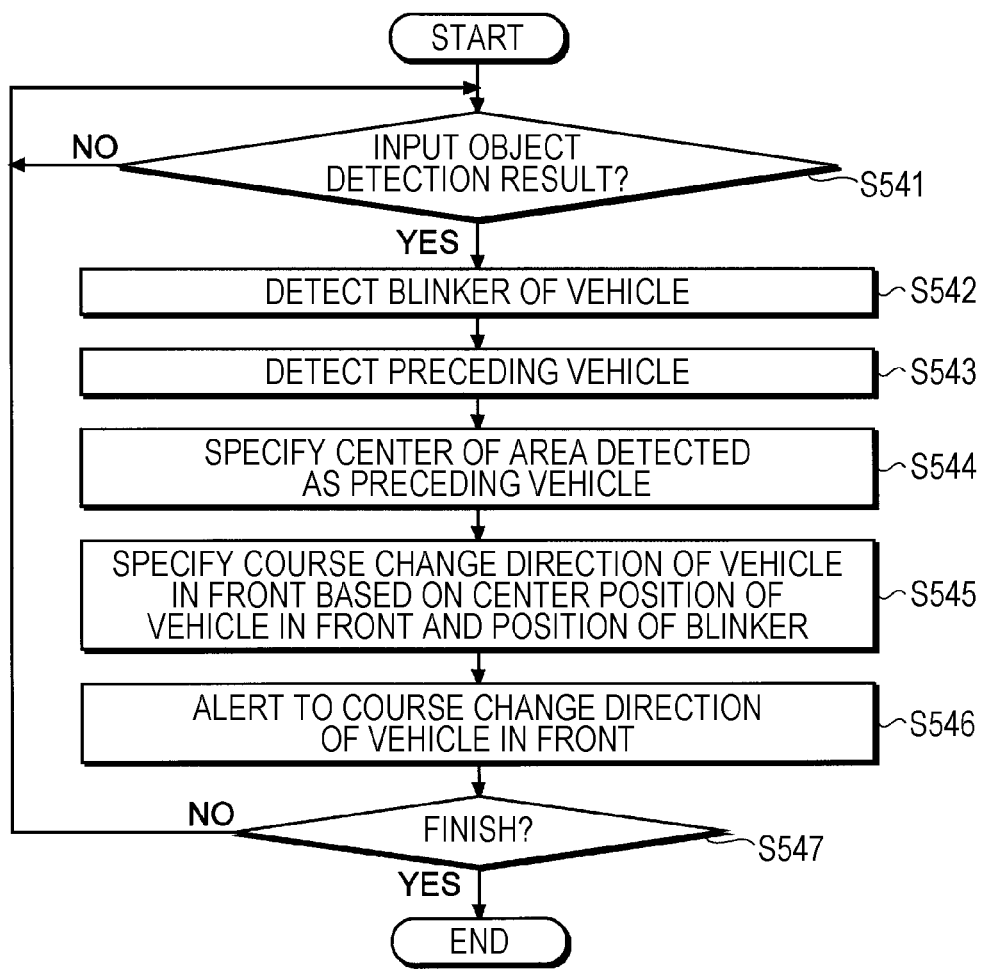
FIG. 20 is a flowchart illustrating an action pattern determination operation according to a fourth example of the fifth embodiment.

FIG. 20 is a flowchart illustrating an action pattern determination operation according to a fourth example. Note that, in the fourth example, a case where it is detected that a blinker of a preceding vehicle starts blinking by the object detection device 1 or 2 according to the above-described embodiments while a vehicle 12100 travels is exemplified.

As illustrated in FIG. 20, in the fourth example, when an object detection result is input from the object detection device 1 or 2 (YES at step S541), an action pattern determination unit 16 detects the blinker of a vehicle being the preceding vehicle on the basis of the object detection result (step S542). Subsequently, the action pattern determination unit 16 detects the preceding vehicle from a region including the blinker in the object detection result (step S543).

Next, the action pattern determination unit 16 specifies the center of an object detection area corresponding to the detected preceding vehicle (step S544), and specifies a course change direction indicated by the preceding vehicle with the blinker from a positional relationship between a position of the center and a flicker detection area corresponding to the blinker (step S546).

Next, the action pattern determination unit 16 drives an audio image output unit 12052 in FIG. 8, for example, to issue an alert notifying a driver of a course change of the preceding vehicle from an audio speaker 12061 and/or displaying the course change of the preceding vehicle on a display unit 12062 (step S546), and proceeds to step S525.

At step S525, the action pattern determination unit 16 determines whether or not to finish this operation, and in a case of finishing (YES at step S525), this finishes this operation. In contrast, in a case of continuing (NO at step S525), the action pattern determination unit 16 returns to step S521 and executes the subsequent operation.

Although the embodiments of the present disclosure are described above, the technical scope of the present disclosure is not limited to the above-described embodiments, and various modifications may be made without departing from the gist of the present disclosure. Furthermore, the components of different embodiments and variations may be appropriately combined.

Furthermore, the effects described in each embodiment of the present specification are illustrative only and are not limitative; there may also be another effect.

Note that the present technology may also have following configurations.

(1)

An object detection device provided with:

a first solid-state imaging device provided with a plurality of pixels arranged in a matrix, the first solid-state imaging device that detects, according to a light amount incident on each of the pixels, occurrence of an event in the pixel;

a flicker detection unit that generates flicker information on the basis of the occurrence of the event detected by the first solid-state imaging device; and an object detection unit that detects an object on the basis of the flicker information detected by the first solid-state imaging device.

(2)

The object detection device according to (1) described above, in which the flicker detection unit specifies an event detection area in which the occurrence of the event is detected in the plurality of pixels, and generates the flicker information on the basis of the number of occurred events detected per predetermined time for the event detection area.

(3)

The object detection device according to (2) described above, in which the flicker detection unit generates the flicker information on the basis of a maximum value or an average value of the numbers of occurred events detected per the predetermined time in the respective pixels belonging to the event detection area.

(4)

The object detection device according to (2) or (3) described above, in which the flicker information includes an edge shape of the event detection area and the number of occurred events detected per the predetermined time.

(5)

The object detection device according to any one of (2) to (4) described above, in which the flicker detection unit sets, as a flicker detection area, an area in which pixels in which the number of occurred events detected per the predetermined time is a first threshold or larger are arranged out of the event detection area, and the object detection unit detects the object imaged in the flicker detection area on the basis of the flicker information.

(6)

The object detection device according to (5) described above, in which the flicker detection unit sets, as the flicker detection area, an area in which the number of pixels in which the number of occurred events detected per the predetermined time is the first threshold or larger is a second threshold or larger out of the event detection area.

(7)

The object detection device according to (2) described above, further provided with:

a second solid-state imaging device that obtains image data, in which the object detection unit detects the object on the basis of the flicker information and the image data.

(8)

The object detection device according to (7) described above, in which the flicker detection unit specifies the event detection area in which the occurrence of the event is detected in the plurality of pixels, and generates the flicker information on the basis of the number of occurred events detected per predetermined time for the event detection area, and the object detection unit specifies an object detection area including an area on the image data corresponding to the event detection area and corresponding to the object, and detects the object on the basis of the object detection area and the flicker information.

(9)

The object detection device according to (7) described above, in which the object detection unit specifies an object detection area corresponding to the object from the image data, the flicker detection unit generates the flicker information on the basis of the number of occurred events detected per predetermined time for an area corresponding to the object detection area in the plurality of pixels, and the object detection unit detects the object on the basis of the object detection area and the flicker information.

(10)

The object detection device according to (2) described above, further provided with:

a control unit that controls reading from the first solid-state imaging device, in which the control unit lowers resolution when monitoring the occurrence of the event for an area in which pixels other than the pixels included in the event detection area out of the plurality of pixels are arranged.

(11)

The object detection device according to (7) described above, further provided with:

a control unit that controls reading from the second solid-state imaging device, in which the control unit lowers resolution of the image data read from an area corresponding to the event detection area in the second solid-state imaging device.

(12)

An object detection system provided with:

a first solid-state imaging device provided with a plurality of pixels arranged in a matrix, the first solid-state imaging device that detects, according to a light amount incident on each of the pixels, occurrence of an event in the pixel;

a flicker detection unit that generates flicker information on the basis of the occurrence of the event detected by the first solid-state imaging device; and an object detection unit that detects an object on the basis of the flicker information detected by the first solid-state imaging device.

(13)

An object detection method provided with:

generating flicker information on the basis of occurrence of an event detected by a solid-state imaging device provided with a plurality of pixels arranged in a matrix, the solid-state imaging device that detects, according to a light amount incident on each of the pixels, the occurrence of the event in the pixel; and detecting an object on the basis of the flicker information.

REFERENCE SIGNS LIST 1, 2 Object detection device (system)
11, 13 Imaging lens
12 Flicker detection unit
14 Image sensor
15 Object detection unit
16 Action pattern determination unit
17 Storage unit
18 I/F unit
120 Data processing unit
121 Memory
122 DSP
130 Control unit
200 DVS
210 Logic circuit
211 Drive circuit
212 Signal processing unit
213 Arbiter
300 Pixel array unit
310 Unit pixel
330 Light reception unit
333 Photoelectric conversion element
400 Address event detection unit
410 Current-voltage conversion unit
411, 413 LG transistor
412, 414 Amplification transistor
415 Constant current circuit
420 Buffer
430 Subtractor
431, 433 Capacitor
432 Inverter
434 Switch
440 Quantizer
441 Comparator
450 Transfer unit
12001 Communication network
12010 Drive system control unit
12030 Vehicle exterior information detection unit
12031, 12101 to 12105 Imaging unit
12050 Integrated control unit
12051 Microcomputer
12052 Audio image output unit
12053 In-vehicle network I/F
12061 Audio speaker
12062 Display unit
12100 Vehicle

The invention claimed is:

1. An object detection device, comprising:

a first solid-state imaging device that includes a plurality of pixels in a matrix, wherein the first solid-state imaging device is configured to detect, based on a light amount incident on each of the plurality of pixels, occurrence of an event in each of the plurality of pixels; and a processor configured to:
generate flicker information based on the occurrence of the event detected by the first solid-state imaging device; and
detect an object based on of the generated flicker information.

2. The object detection device according to claim 1, wherein the processor is further configured to:
specify an event detection area in which the occurrence of the event is detected in the plurality of pixels; and
generate the flicker information based on a number of occurred events detected in a period of time for the event detection area.

3. The object detection device according to claim 2, wherein the processor is further configured to generate the flicker information based on one of a basis of a maximum value or an average value of numbers of occurred events detected in the period of time in respective pixels belonging to the event detection area.

4. The object detection device according to claim 2, wherein the flicker information includes an edge shape of the event detection area and the number of occurred events detected in the period of time.

5. The object detection device according to claim 2, wherein
the processor is further configured to:
set, as a flicker detection area, an area in which a set of pixels of the plurality of pixels are out of the event detection area, wherein the number of occurred events detected in the set of pixels in the period of time is equal to or more than a first threshold; and
detect the object imaged in the flicker detection area based on the flicker information.

6. The object detection device according to claim 5, wherein the processor is further configured to set, as the flicker detection area, an area in which a number of pixels in the set of pixels in which the number of occurred events detected in the period of time is equal to or more than a second threshold is out of the event detection area.

7. The object detection device according to claim 2, further comprising
a second solid-state imaging device to obtain image data, wherein the processor is further configured to detect the object based on the flicker information and the image data.

8. The object detection device according to claim 7, wherein the processor is further configured to:
specify the event detection area in which the occurrence of the event is detected in the plurality of pixels;
generate the flicker information based on the number of occurred events detected in the period of time for the event detection area;
specify an object detection area including an area on the image data corresponding to the event detection area and corresponding to the object; and
detect the object based on the object detection area and the flicker information.

9. The object detection device according to claim 7, wherein the processor is further configured to:
specify an object detection area corresponding to the object from the image data;
generate the flicker information based on the number of occurred events detected in the period of time for an area corresponding to the object detection area in the plurality of pixels; and
detect the object based on the object detection area and the flicker information.

10. The object detection device according to claim 2, wherein the processor is further configured to:
control reading from the first solid-state imaging device; and
lower resolution for an area in which a set of pixels of the plurality of pixels are present, wherein the set of pixels is different from pixels included in the event detection area.

11. The object detection device according to claim 7, wherein the processor is further configured to:
control reading from the second solid-state imaging device; and
lower resolution of the image data read from an area corresponding to the event detection area in the second solid-state imaging device.

12. An object detection method, comprising:
detecting, based on a light amount incident on each of a plurality of pixels, occurrence of an event in each of the plurality of pixels, wherein a solid-state imaging device includes the plurality of pixels in a matrix;
generating flicker information based on the occurrence of the event; and
detecting an object based on the generated flicker information.

* * * * *